United States Patent
Fielder

(10) Patent No.: US 9,407,610 B2
(45) Date of Patent: *Aug. 2, 2016

(54) METHOD AND SYSTEM FOR SECURING COMMUNICATION

(71) Applicant: Guy Fielder, Austin, TX (US)

(72) Inventor: Guy Fielder, Austin, TX (US)

(73) Assignee: PACID TECHNOLOGIES, LLC, Austin, TX (US)

( * ) Notice: Subject to any disclaimer, the term of this patent is extended or adjusted under 35 U.S.C. 154(b) by 87 days.

This patent is subject to a terminal disclaimer.

(21) Appl. No.: 14/307,594

(22) Filed: Jun. 18, 2014

(65) Prior Publication Data

US 2014/0298019 A1    Oct. 2, 2014

Related U.S. Application Data

(63) Continuation of application No. 13/203,377, filed as application No. PCT/US2010/028583 on Mar. 25, 2010, now Pat. No. 8,782,408.

(60) Provisional application No. 61/163,417, filed on Mar. 25, 2009.

(51) Int. Cl.
  *H04L 9/32*    (2006.01)
  *H04L 29/06*   (2006.01)
  (Continued)

(52) U.S. Cl.
  CPC .......... *H04L 63/0428* (2013.01); *H04L 9/0838* (2013.01); *H04L 9/16* (2013.01)

(58) Field of Classification Search
  CPC ....... H04L 9/0838; H04L 9/16; H04L 9/0869; H04L 9/065; H04L 63/0428; G06F 21/602; G06F 21/606

USPC ................. 713/168, 171, 169, 181, 156, 189; 370/338; 709/204
  See application file for complete search history.

(56) References Cited

U.S. PATENT DOCUMENTS

| 4,613,901 A | 9/1986 | Gilhousen et al. |
| 4,649,233 A | 3/1987 | Bass et al. |

(Continued)

FOREIGN PATENT DOCUMENTS

| EP | 1304848 A2 | 4/2003 |
| EP | 1478156 A2 | 11/2004 |

(Continued)

OTHER PUBLICATIONS

Kaya (2003). Secure multicast groups on ad hoc networks. SASN '03 Proceedings of the 1st ACM Workshop on Security of ad hoc and sensor networks, pp. 94-102.*

(Continued)

*Primary Examiner* — Brian Shaw
(74) *Attorney, Agent, or Firm* — Ascenda Law Group, PC

(57) ABSTRACT

A method for generating one or more secrets for use by members. The method includes sending a first request for connection with a second member, and sending a second request to connection with a third member. The method further includes receiving, by the first member from the second member, a second input after the first request is sent and after communication is initiated between the first member and the second member and receiving, by the first member from the third member, a third input after the second request is sent and after communication is initiated between the first member and the third member. The method further includes generating, using an n-bit generator executing on the first member, a message digest using a first input, the second input, and the third input, extracting a secret from the message digest, and storing the secret in a secrets repository on the first member.

21 Claims, 12 Drawing Sheets

(51) Int. Cl.
*H04L 9/08* (2006.01)
*H04L 9/16* (2006.01)

(56) References Cited

U.S. PATENT DOCUMENTS

| | | |
|---|---|---|
| 4,720,860 A | 1/1988 | Weiss |
| 4,864,615 A | 9/1989 | Bennett et al. |
| 4,924,515 A | 5/1990 | Matyas et al. |
| 4,937,866 A | 6/1990 | Crowther et al. |
| 5,020,105 A | 5/1991 | Rosen et al. |
| 5,060,263 A | 10/1991 | Bosen et al. |
| 5,065,429 A | 11/1991 | Lang |
| 5,068,894 A | 11/1991 | Hoppe |
| 5,153,919 A | 10/1992 | Reeds, III et al. |
| 5,233,655 A | 8/1993 | Shapiro |
| 5,237,610 A | 8/1993 | Gammie et al. |
| 5,241,598 A | 8/1993 | Raith |
| 5,309,516 A | 5/1994 | Takaragi et al. |
| 5,355,413 A | 10/1994 | Ohno |
| 5,361,062 A | 11/1994 | Weiss et al. |
| 5,367,572 A | 11/1994 | Weiss |
| 5,475,758 A | 12/1995 | Kikuchi |
| 5,475,826 A | 12/1995 | Fischer |
| 5,481,611 A | 1/1996 | Owens et al. |
| 5,495,533 A | 2/1996 | Linehan et al. |
| 5,638,448 A | 6/1997 | Nguyen |
| 5,757,924 A | 5/1998 | Friedman et al. |
| 5,796,830 A | 8/1998 | Johnson et al. |
| 5,953,420 A | 9/1999 | Matyas, Jr. et al. |
| 5,963,646 A | 10/1999 | Fielder et al. |
| 5,963,696 A | 10/1999 | Yoshida et al. |
| 5,966,441 A | 10/1999 | Calamera |
| 5,974,550 A | 10/1999 | Maliszewski |
| 5,995,623 A | 11/1999 | Kawano et al. |
| 5,995,624 A | 11/1999 | Fielder et al. |
| 6,049,612 A | 4/2000 | Fielder et al. |
| 6,105,133 A | 8/2000 | Fielder et al. |
| 6,345,101 B1 | 2/2002 | Shukla |
| 6,490,353 B1 | 12/2002 | Tan |
| 6,587,563 B1 | 7/2003 | Crandall |
| 6,636,968 B1 * | 10/2003 | Rosner .............. H04L 9/0833 713/178 |
| 6,769,060 B1 | 7/2004 | Dent et al. |
| 6,947,556 B1 | 9/2005 | Matyas, Jr. et al. |
| 6,987,853 B2 | 1/2006 | Uner |
| 7,032,240 B1 | 4/2006 | Cronce et al. |
| 7,095,855 B1 | 8/2006 | Collins |
| 7,178,025 B2 | 2/2007 | Scheidt et al. |
| 7,890,769 B2 | 2/2011 | Chen et al. |
| 2002/0143872 A1 | 10/2002 | Weiss et al. |
| 2002/0191796 A1 | 12/2002 | Muschenborn |
| 2004/0025028 A1 | 2/2004 | Takeuchi |
| 2004/0179684 A1 | 9/2004 | Appenzeller et al. |
| 2004/0230800 A1 | 11/2004 | Futa et al. |
| 2005/0039030 A1 | 2/2005 | Rodgers et al. |
| 2005/0063352 A1 | 3/2005 | Amara et al. |
| 2005/0076061 A1 | 4/2005 | Cox |
| 2006/0112418 A1 | 5/2006 | Bantz et al. |
| 2006/0174349 A1 | 8/2006 | Cronce et al. |
| 2006/0210082 A1 | 9/2006 | Devadas et al. |
| 2007/0130463 A1 | 6/2007 | Law et al. |
| 2007/0150742 A1 | 6/2007 | Cukier et al. |
| 2007/0255941 A1 | 11/2007 | Ellis |
| 2007/0258584 A1 | 11/2007 | Brown et al. |
| 2008/0065880 A1 | 3/2008 | Martin |
| 2008/0098464 A1 | 4/2008 | Mizrah |
| 2008/0244078 A1 | 10/2008 | Viljoen et al. |
| 2008/0270791 A1 | 10/2008 | Nystrom et al. |
| 2009/0094520 A1 | 4/2009 | Kulas |
| 2010/0070778 A1 | 3/2010 | Murray |

FOREIGN PATENT DOCUMENTS

| | | |
|---|---|---|
| EP | 1906587 A2 | 4/2008 |
| GB | 2421407 A | 6/2006 |
| GB | 2478147 A | 8/2011 |
| WO | 9847258 A2 | 10/1998 |
| WO | 03077469 A1 | 9/2003 |
| WO | 2004092864 A2 | 10/2004 |
| WO | 2005107287 A1 | 11/2005 |
| WO | 2005119397 A1 | 12/2005 |
| WO | 2007005909 A2 | 1/2007 |
| WO | 2008061848 A2 | 5/2008 |
| WO | 2009074956 A1 | 6/2009 |
| WO | 2010103345 A1 | 9/2010 |
| WO | 2010149407 A1 | 12/2010 |
| WO | 2011068719 A1 | 6/2011 |
| WO | 2011089143 A1 | 7/2011 |

OTHER PUBLICATIONS

International Search Report and the Written Opinion issued in PCT/US2010/028583; Dated: Jul. 6, 2010; (14 pages).
0International Search Report and the Written Opinion issued in PCT/US2010/028582: Dated: Jul. 30, 2010; (14 pages).
Yuill, J., Denning, D., Feer, F.; "Using Deception to Hide Things from Hackers: Processes, Principles, and Techniques", Journal of Information Warfare, (16 pages).
Schneider, B., "Security Pitfalls in Cryptography", Counterpane Systems, www.counterpane.com/publish.html, 1998, (11 pages).
Schneier, B., "Why Cryptography is Harder Than it Looks", Counterpane Systems, www.counterpane.com/publish.html, 1997, (8 pages).
Schneier, B., "Cryptographic Design Vulnerabilities", Counterpane Systems, www.counterpane.com/publish.html, Sep. 1998, (5 pages).
Bellare, Mihir Rogaway, Phillip, "Entity Authentication and Key Distribution," Advances in Crypto 1993 Proceedings, Springer-Verlag (Aug. 1993).
Bird, R. et al, "The KryptoKnight Family of Light-Weight Protocols for Authentication and Key Distribution," IEEE/ACM Transactions on Networking, vol. 3, No. 1, pp. 31-41, IEEE Press, Piscataway, NJ, Feb. 1995.
Damgard, I.B., "A Design Principle for Hash Functions,", Springer-Verlag, New York, 1998.
Gong, L., "Using One-Way Functions for Authentication," ACM Sigcom computer Communication Review, vol. 19, Issue 5, pp. 8-11, New York, 1989.
Krawczyk, H., "SKEME: A Versatile Secure Key Exchange Mechanism for Internet," Proceedings of the 1996 Sympoium on Network and Distributed System Security (SNDSS) '96, pp. 114-127, IEEE Computer Society, Washington, DC (1996).
Leighton, T.and Micali, Silvio, "Secret Key Agreement without Public-Key Cryptography", Springer-Verlag, New York, 1998.
Matyas, S.M. & Meyer, C.H., "Generation, Distribution, and Installation of Cryptograpic Keys," 17 IBM Sys. J. 2 (1978).
Merkle, R., "One Way Hash functions and DES," In In G. Brassard, editor, Advances in Cryptology: Proceedings of CRYPTO'89, vol. 435 of Lecture Notes in Computer Science, pp. 428-446, Springer-Verlag, New York, 1990.
Molva, Reflik et al., "KryptoKnight Authentication and Key Distibution System," Computer Security—ESORICS 92 (Nov. 23-25, 1992).
Menezes, Alfred J. et al., Handbook of Applied Cryptography, CRC Press, Oct. 16, 1996.
Preneel, B., "MDx-MAC and Building Fast MACs from Hash Functions," Lecture Notes in Computer Science; vol. 963, Proceedings of the 15th Annual International Cryptology Conference on Advances in Cryptology, pp. 1-14, Springer-Verlag, London, UK (1995).
Schneier, Bruce, Applied Cryptography, Katherine Schowalter, 1996 (and first edition (1994) of same).
Freier, A. et al., "SSL Version 3.0," Netscape Communications Corporation, Dec. 1995.
RSA Laboratories, "PKCS #5: Password-Based Encryption Standard," version 1.5, Nov. 1993.
Rivest, R., "The MD5 Message-Digest Algorithm," IETF RFC 1321, Apr. 1992.
Berson, Thomas A., "Differential Cryptanalysis Mod 232 with Applications to MD5". EUROCRYPT. (1992).

(56) References Cited

OTHER PUBLICATIONS

Bert den Boer, Antoon Bosselaers (1993). Collisions for the Compression Function of MD5. Berlin; London: Soringer. ISBN 3-540-57600-2.
Kelsey, John et al., "Passphrase FAQ," alt.security.pgp, Oct. 1993.
"Windows '95 Vulnerabilities", US Department of Energy, Computer Incident Advisory Committee, available at http://ftp.cerias.purdue.edu/pub/lists/academic-firewalls/academic-firewalls.951224 (1995).
Carl Meyer and S.M. Matyas, Cryptography: A New Dimension in Computer Data Security (1982).
Hans Dobbertin, Cryptanalysis of MD5 Compress, May 2, 1996.
Hans Dobbertin, "The Status of MD5 After a Recent Attack", RSA Laboratories; CryptoBytes, 1996.
Ehrsam, W.F. et al., A Cryptographic Key Management Scheme for Implementing the Data Encryption Standard, IBM Sys. J., vol. 17 No. 2, 1978.
Cheng, P. et al., Modular Key Management Protocol (MKMP), Nov. 28, 1994.
RSA Laboratories, PKCS #5 v2.0: PAssword-Based Cryptography Standard, Mar. 25, 1999.
U.S. Department of Commerce, National Institute of Standards and Technology, "Secure Hash Standard", FIPS PUB 180-1, Apr. 17, 1995. (24 pages).
International Preliminary Report on Patentability and the Written Opinion issued in PCT/US2010/028562; Dated: Oct. 6, 2011; (15 pages).
International Preliminary Report on Patentability and the Written Opinion issued in PCT/US2010/028565 Dated: Oct. 6, 2011; (16 pages).
International Preliminary Report on Patentability and the Written Opinion issued in PCT/US2010/028582; Dated: Oct. 6, 2011; (8 pages).
International Preliminary Report on Patentability and the Written Opinion issued in PCT/US2010/028583; Dated: Oct. 6, 2011; (9 pages).
International Preliminary Report on Patentability and the Written Opinion issued in PCT/US2010/028566; Dated: Oct. 6, 2011; (7 pages).
International Search Report and the Written Opinion issued in PCT/US2010/028566; Dated: Dec. 30, 2010; (10 pages).
International Search Report and the Written Opinion issued in PCT/US2010/028565; Dated: Oct. 6, 2010; (24 pages).
International Search Report and the Written Opinion issued in PCT/US2010/028562; Dated: Sep. 29, 2010; (24 pages).
Barrett, Daniel and Sliverman, Richard, "SSH, The Secure Shell: The Definitive Guide, 2nd Edition", O'Reilly Media, Section 2.4, Section 3.3, Section 3.4, Section 6.1-6.7. May 1, 2005.
M. Decker et al.; "The SumoDacs-project: Secure Mobile Data Access with a Tamperproof Hardware Token"; eChallenges e-2010 Conference Proceedings, IIMC; 2010 (8 pages).
N. Gunson et al.; "User Perceptions of Security and Usability of Single-Factor and Two-Factor Authentication in Automated Telephone Banking"; ScienceDirect, vol. 30, No. 4; pp. 208-220 (13 pages).
K. Jävinen et al.; "Embedded SFE: Offloading Server and Network Using Hardware Tokens"; Financial Cryptography and Data Security Proceeding, 14th International Conference, FC 2010; Tenerife, Canary Islands, Jan. 25-28, 2010 (15 pages).
I. Lin et al.; "A Practical Electronic Payment System for Message Delivery Service in the Mobile Environment"; Wireless Personal Communications, vol. 42, No. 2; pp. 247-261; Jul. 2007 (15 pages).
D. Sun et al.; "A New Design of Wearable Token System for Mobile Device Security"; IEEE Transactions on Consumer Electronics, vol. 54, No. 4; pp. 1784-1789; Nov. 2008 (6 pages).
M. Fischer v. Mollard et al.; "Gnu Privacy Guard (GnuPG) Mini Howto"; retrieved from the Internet: http://www.gnupg.org/documentation/howtos.en.html, version 0.1.4; Aug. 10, 2004 (14 pages).
I. Dåmgard; "A Design Principle for Hash Functions"; Advances in Cryptology: Proceedings of CRYPTO '89, vol. 435 of Lecture Notes in Computer Science; pp. 416-427; Springer-Verlag, New York (12 pages).
Brenno de Winter; "Gnu Privacy Guard (GnuPG) Mini Howto"; retrieved from the Internet: http://www.gnupg.org/documentation/howtos.en.html, version 0.1.4; Aug. 10, 2004 (14 pages).

\* cited by examiner

| 334X ALGORITHM SELECTOR X BITS | 336X ENCRYPTION KEY X MOST SIGNIFICANT BITS | 336Y ENCRYPTION KEY Y MOST SIGNIFICANT BITS | 338 CHANGE VALUE |

330 — EXAMPLE FIRST MESSAGE DIGEST

FIG. 8A

| 334Y ALGORITHM SELECTOR Y BITS | 340X ENCRYPTION KEY X LEAST SIGNIFICANT BITS | 340Y ENCRYPTION KEY Y LEAST SIGNIFICANT BITS | 342 CHANGE VALUE |

332 — EXAMPLE SECOND MESSAGE DIGEST

FIG. 8B

METHOD AND SYSTEM FOR SECURING COMMUNICATION

CROSS-REFERENCE TO RELATED APPLICATIONS

The present application is a continuation of and claims benefit under 35 U.S.C. §120 to U.S. patent application Ser. No. 13/203,377. U.S. patent application Ser. No. 13/203,377 claims benefit to PCT Application No. PCT/US10/28583 filed on Mar. 25, 2010, entitled, "METHOD AND SYSTEM FOR SECURING COMMUNICATION". PCT Application No. PCT/US10/28583 claims priority to U.S. Provisional Application No. 61/163,417 filed on Mar. 25, 2009 and entitled, "BILATERAL AUTHENTICATION AND ENCRYPTION SYSTEM INCLUDING ENCRYPTION ALGORITHM SELECTION" all of the aforementioned applications are incorporated herein by reference.

BACKGROUND

The computer system assists in managing (e.g., storing, organizing, and communicating) a large amount of information. Some of the information managed by a computer system is confidential. In other words, access to such information is intended to be limited. Traditional protection schemes attempt to prevent unauthorized users from accessing the confidential information by requiring that a user provide user credentials, for example, a username and password, at a predefined entry point, to access an account that includes the confidential information. Protecting only the predefined entry points, however, fails to account for nefarious individuals creating other entry points by exploiting computer system vulnerabilities. For example, knowledge of a user's hardware and software system, system configuration, types of network connections, etc. may be used to create an entry point and gain access to the confidential information.

In order to prevent unauthorized access to the confidential information, the confidential information may be encrypted. Encryption is a process of transforming the clear text confidential information into an encrypted format that is unreadable by anyone or anything that does not possess a corresponding decryption key. An encryption algorithm and an encryption key are used to perform the transformation. Encryption technology is classified into two primary technology types: symmetric encryption technology and asymmetric encryption technology. Symmetric encryption technology uses the same encryption key to both encrypt and decrypt confidential information. Asymmetric encryption technology uses a pair of corresponding encryption keys: one encryption key to encrypt data and the other encryption key of the pair to decrypt the data.

SUMMARY

In general, in one aspect, the invention relates to a method for generating at least one secret for use by members. A first member sends a first request for connection with a second member. The first member sends a second request to connect with a third member. The first member receives, from the second member, a second input after the first request is sent and after communication is initiated between the first member and the second member, and receives, from the third member, a third input after the second request is sent and after communication is initiated between the first member and the third member. The method further includes generating, using an n-bit generator executing on the first member, a message digest using a first input, the second input, and the third input. The first input is not obtained from the second member and the first input is not obtained from the third member. The method further includes extracting a secret from the message digest, and storing the secret in a secrets repository on the first member.

In general, in one aspect, the invention relates to a method for generating a secret for use by multiple members. The method includes a first member receiving a request to contact a second member. In response to the request, communication between the first member and the second member is initiated. The first member receives, from the second member, second input after communication is initiated between the first member and the second member. The method further includes generating, using an n-bit generator executing on the first member, a message digest using at least a first input and the second input, where the first input is not obtained from the second member. The method further includes extracting a secret from the message digest, and storing the secret in a secrets repository on the first member.

In general, in one aspect, the invention relates to non-transitory computer readable medium including instructions, which when executed by a processor, perform a method. The method includes a first member sending a first request for connection with a second member. The first member receives, from the second member, a second input after the first request is sent and after communication is initiated between the first member and the second member. The method further includes generating, using an n-bit generator executing on the first member, a message digest using at least a first input and the second input. The method further includes extracting a secret from the message digest, and storing the secret in a secrets repository on the first member. The first member generates, using the n-bit generator and the secret, a second message digest. The method further includes encrypting communication between at least the first member and the second member using at least a portion of the second message digest.

Other aspects of the invention will be apparent from the following description and the appended claims.

BRIEF DESCRIPTION OF DRAWINGS

FIGS. 2-5B show flowcharts in accordance with one or more embodiments of the invention.

FIGS. 6-8B show example message digests in accordance with one or more embodiments of the invention.

DETAILED DESCRIPTION

Figure 1A:
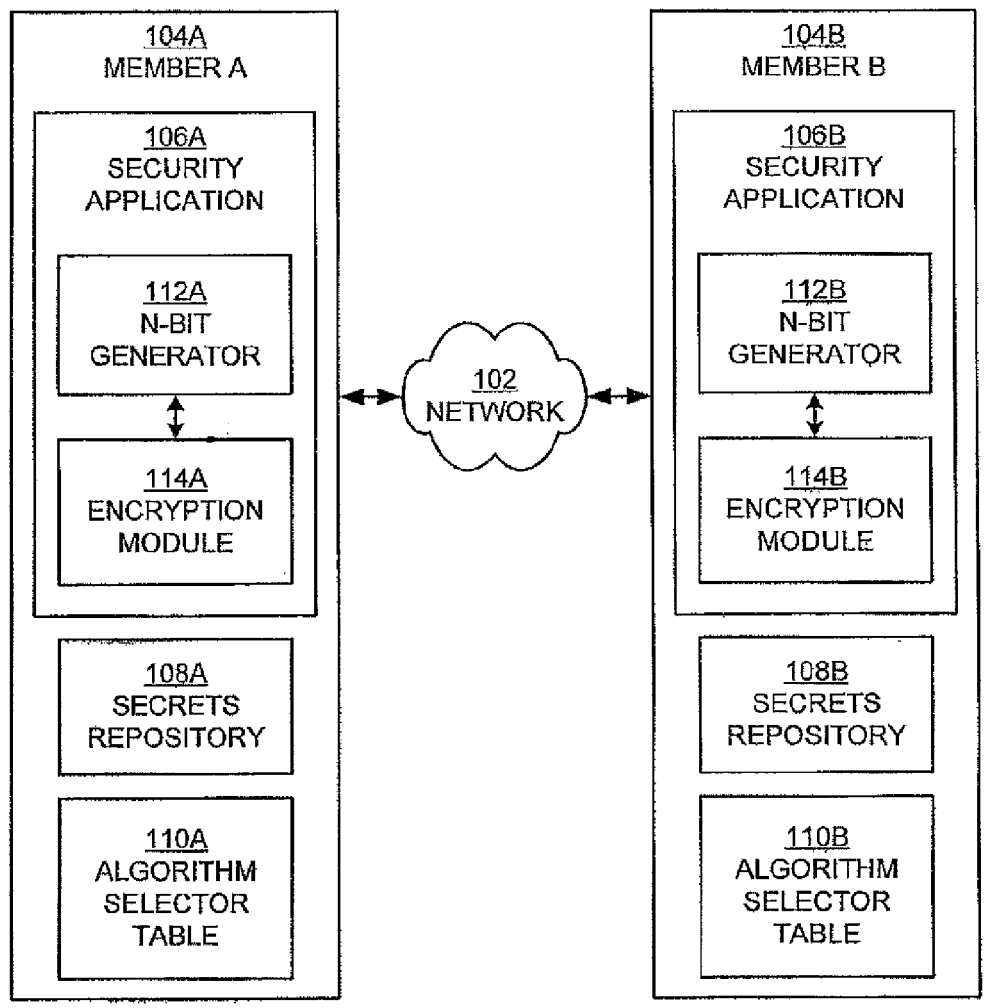
FIGS. 1A-1B show schematic diagrams in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention relate to securing communication between members of a group, where each member is a computing device. In one or more embodiments of the invention, the group is two or more members that share (or intend to share) confidential information. The confidential information may be transmitted as communication (or portion thereof). Examples of communications include, but are not limited to, short messaging service (SMS) messages, electronic mail (e-mail), chat messages, audio message, graphics, audio-visual messages (e.g., video file, streaming video, etc.). As used herein, a communication is encrypted when at least a portion of the communication is encrypted.

In one embodiment of the invention, a computing device is any physical or virtual device that may be used to perform embodiments of the invention. The physical device may correspond to any physical system with functionality to implement one or more embodiments of the invention. For example, the physical device may be implemented on a general purpose computing device (i.e., a device with a processor (s) and an operating system) such as, but not limited to, a desktop computer, a laptop computer, a gaming console, a mobile device (e.g., smart phone, a personal digital assistant, gaming device).

Alternatively, the physical device may be a special purpose computing device that includes an application-specific processor(s)/hardware configured to only execute embodiments of the invention. In such cases, the physical device may implement embodiments of the invention in hardware as a family of circuits and limited functionality to receive input and generate output in accordance with various embodiments of the invention. In addition, such computing devices may use a state-machine to implement various embodiments of the invention.

In another embodiment of the invention, the physical device may correspond to a computing device that includes both a general purpose processor(s) and an application-specific processor(s)/hardware. In such cases, one or more portions of the invention may be implemented using the operating system and general purpose processor(s), and one or more portions of the invention may be implemented using the application-specific processor(s)/hardware.

The virtual device may correspond to a virtual machine. Broadly speaking, the virtual machines are distinct operating environments configured to inherit underlying functionality of the host operating system (and access to the underlying host hardware) via an abstraction layer. In one or more embodiments of the invention, a virtual machine includes a separate instance of an operating system, which is distinct from the host operating system. For example, one or more embodiments of the invention may be implemented on VMware® architectures involving: (i) one or more virtual machines executing on a host computer system such that each virtual machine serves as host to an instance of a guest operating system; and (ii) a hypervisor layer serving to facilitate intra-host communication between the one or more virtual machines and host computer system hardware. Alternatively, one or more embodiments of the invention may be implemented on Xen® architectures involving: (i) a control host operating system (e.g., Dom 0) including a hypervisor; and (ii) one or more VMs (e.g., Dom U) executing guest operating system instances. The invention is not limited to the aforementioned exemplary architectures. VMware® is a registered trademark of VMware, Inc. Xen® is a trademark overseen by the Xen Project Advisory Board.

Each of the members may be used by, for example, an individual, a business entity, a family, any other entity, or any combination thereof. For example, a group may have, as members, John Smith's computing device and Jane Doe's computing device. As another example, a group may have, as members, John Smith's smart phone, John Smith's personal computer, and John Smith's gaming console. As another example, a group may have, as members, John Smith's computing device, Jane Smith's computing device, and the servers of the Smith's financial advisors. Other possible groups may exist without departing from the scope of the invention.

In one or more embodiments of the invention, an n-bit generator executing on a member of the group generates one or more message digest(s) using a secret. The generated message digest(s) includes encryption solutions. An encryption solution includes parameters used to encrypt communications. By way of an example and not intended to limit the scope of the invention, an encryption solution may include an encryption key, an encryption key length, algorithm selector bits for selecting the encryption algorithm, and/or other components.

In one or more embodiments of the invention, each member or subset of members has a corresponding unique encryption solution that the member uses to send or receive communications by the member or subset of members. Thus, the encryption solution for sending communications is different then the encryption solution for receiving communications. Each member generates the encryption solution for each other member of the group. Specifically, when a communication is to be sent, a first encryption solution is obtained and used to encrypt the communication. The member sends the encrypted communication to other member(s) of the group. The other member(s) may use the first encryption solution to decrypt the encrypted communication. Specifically, the other members use their copy of the first encryption solution to decrypt the encrypted communication. Further, when an encrypted communication is received, the second encryption solution is obtained and used to decrypt the communication.

If the encryption solution includes algorithm selector bits, then the algorithm selector bits allow for changing of the encryption algorithm that is used by the members of the group. Specifically, not only may the encryption key change periodically, but the encryption algorithm may also change. Further, the encryption algorithm may be different for the communications sent and the communications received. Thus, a nefarious user or computer system may be unlikely to both identify the encryption algorithm and the encryption key for both the sending side and the receiving side of a given communication between members of a group.

Figure 1B:
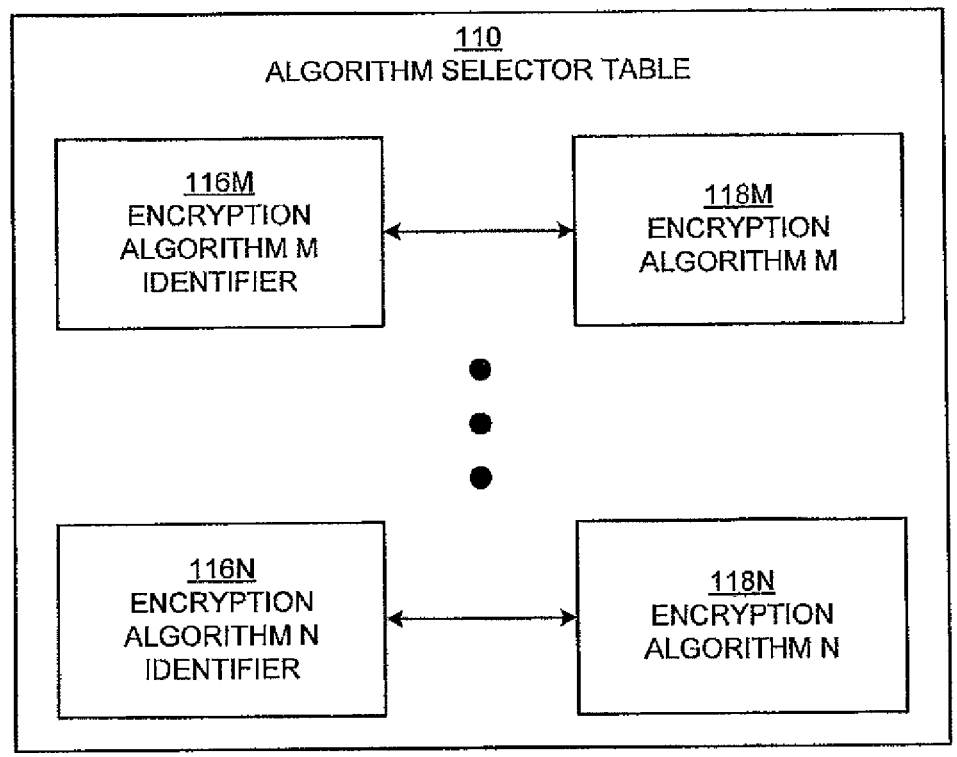

In one or more embodiments of the invention, an encryption solution includes information used to encrypt and/or decrypt a communication. For example, the encryption solution may include an encryption key, a key length of the encryption key, algorithm selector bits for selecting an encryption algorithm, and/or any other component that may be used for encryption FIGS. 1A-1B show schematic diagrams in accordance with one or more embodiments of the invention. As shown in FIG. 1A, the system includes a network (102) and members (e.g., 104A, 104B). These components are described below.

In one or more embodiments of the invention, a network (102) is an interconnection of devices that allow for communication between any two devices within the network. For example, the network (102) may correspond to a local area network (LAN), a wide area network (WAN), such as the Internet, any other type of wired or wireless network, or combination thereof.

In one or more embodiments of the invention, each member (e.g., 104A, 104B) includes a security application (e.g., 106A, 106B), a secrets repository (e.g., 108A, 108B), and an algorithm selector table (110A, 110B). The security application (e.g., 106A, 106B) on each member (e.g., 104A, 104B)

may be instances of the same application, different versions of the same application, or different applications. Further, the security application (e.g., 106A, 106B) may correspond to a complete program product or a programming module of another application. For example, the security application (e.g., 106A, 106B) may be a part of and provide security for a banking or commerce application. In one or more embodiments of the invention, the security application (e.g., 106A, 106B) includes an n-bit generator (e.g. 112A, 112B) and an encryption module (e.g. 114A, 114B). Each of the components of the security application (e.g. 106A, 106B) may be implemented in hardware, software, firmware, or a combination thereof. The components of the security application are discussed below.

In one or more embodiments of the invention, an n-bit generator (e.g., 112A, 112B) includes functionality to receive and process one or more inputs to generate a message digest. A message digest is a string of characters, which may be represented as a bit-string, in accordance with one or more embodiments of the invention. In one or more embodiments of the invention, the message digest is a bit string. Further, the n-bit generator includes functionality to generate a deterministic and repeatable message digest, which appears pseudo-random or random, in accordance with one or more embodiments of the invention. A pseudo-random output (e.g., message digest) is output that is repeatable and predictable but appears random. Specifically, in one or more embodiments of the invention, although the message digest is repeatable and calculable when the inputs and the operations performed by the n-bit generator (e.g., 112A, 112B) are known, the message digest appears random. The apparent randomness may be with respect to someone who knows or does not know the inputs in accordance with one or more embodiments of the invention. Alternatively, or additionally, the apparent randomness may be with respect to someone who does not know the operations performed by the n-bit generator in accordance with one or more embodiments of the invention. In one or more embodiments of the invention, the message digest is deterministic in that a single output exists for a given set of inputs. Moreover, the message digest may be a fixed length. In other words, regardless of the input length, the same n-bit generator (e.g., 112A, 112B) may produce a message digest with a fixed length.

The number of bits in the input to the n-bit generator may be different or the same as the number of bits in the output produced by the n-bit generator. For example, if the n-bit generator accepts n number of bits for input and produces m number of bits for output, m may be less than, equal to, or greater than n. Multiple iterations of the n-bit generator may be performed to construct an ever-increasing m-bit result that includes multiple message digests.

Further, the n-bit generator (e.g., 112A, 112B) includes functionality to generate a deterministic message digest. Specifically, the n-bit generator (e.g., 112A, 112B) has the following two properties. First, the n-bit generator (e.g., 112A, 112B) generates the same message digest when provided with the same input(s). Second, the n-bit generator generates, with a high probability, a different message digest when provided with different input(s). For example, a single bit change in the input may result in a significant change of the bits in the resulting message digest. In the example, the change may be fifty percent of the bits depending on the type of n-bit generator used. However, a greater percentage or less percentage of bits may change without departing from the scope of the invention.

The n-bit generator (e.g., 112A, 112B) may include multiple sub-routines, such as a bit shuffler (not shown) and a hash function (not shown). In one or more embodiments of the invention, the bit shuffler includes functionality to combine multiple inputs into a single output. Specifically, the bit shuffler applies a function to the bit level representation of inputs to generate a resulting set of output bits. The output of the bit shuffler may appear as a shuffling of bits in each of inputs and may or may not have the same ratio of 1's to 0's as the input. In one or more embodiments of the invention, the bit shuffling by the bit shuffler has a commutative property. In other words, the order that inputs are provided to the bit shuffler does not affect the output. For example, consider the scenario in which the inputs are input X, input Y, and input Z. Bit shuffling on input X, input Y, and input Z produces the same output as bit shuffling on input Y, input Z, and input X.

In one embodiment of the invention, the bit shuffler may correspond to any function or series of functions for combining inputs. For example, the bit shuffler may correspond to the XOR function, the multiplication function, an addition function, or another function that may be used to combine inputs. As another example, the security application with the bit shuffler may correspond to a function that orders the inputs and then uses a non-commutative function to generate an output. The bit shuffler may correspond to other mechanisms for combining multiple inputs without departing from the scope of the invention.

In one or more embodiments of the invention, a hash function is a function that includes functionality to receive an input and produce a pseudo-random output. In one or more embodiments of the invention, the hash function may include functionality to convert a variable length input into a fixed length output. For example, the hash function may correspond to GOST, HAVAL, MD2, MD4, MD5, PANAMA, SNEERU, a member of the RIPEMD family of hash functions, a member of the SHA family of hash functions, Tiger, Whirlpool, S-Box, P-Box, any other hash function, or any combination thereof.

Although the above description discusses the use of the bit shuffler prior to the hash function, in one or more embodiments of the invention, the hash function operations may be performed prior to the bit shuffler operations. For example, the hash function may be performed separately on each of the inputs to create hashed inputs. The hashed inputs may then be combined by the bit shuffler. Alternatively, the bit shuffler may be first performed on the inputs to create a single intermediate result before the intermediate result is provided to the hash function. The intermediate result may be stored to be used later to create subsequent message digests.

In one or more embodiments of the invention, the n-bit generator (e.g., 112A, 112B) is operatively connected to an encryption module (e.g., 114A, 114B). The encryption module (e.g., 114A, 114B) includes functionality to manage the encryption and decryption of information for the member (e.g., 104A, 104B). For example, the encryption module may include functionality to send an encrypted communication by requesting one or more message digests from the n-bit generator (e.g., 112A, 112B), extracting a encryption solution from the one or more message digests, and encrypting the information using the encryption solution. Alternatively, or additionally, the encryption module (e.g., 114A, 114B) may include functionality to receive an encrypted communication, extract another encryption solution from the one or more message digests, and decrypt the encrypted communication using the other encryption solution.

In one or more embodiments of the invention, the encryption module (e.g., 114A, 114B) is identically configured across all members of a group to request the same number of message digests. The configuration may be based, for example, on the type of communication, the encryption algorithm, and/or the type of data to be extracted from the message digest.

The encryption module (e.g., 114A, 114B) implements one or more encryption algorithms. In one or more embodiments of the invention, the encryption algorithm includes functionality to transform information in a clear text format into an encrypted format that is unreadable by anyone or anything that does not possess a corresponding encryption key. For example, the encryption algorithm may correspond to Data Encryption Algorithm (DEA) specified in the Data Encryption Standard (DES), Triple DES, Advanced Encryption Standard (AES), FEAL, SKIPJACK, any other encryption algorithm, or any combination thereof. In one or more embodiments of the invention, the encryption module implements only symmetric encryption algorithm(s). The encryption module (e.g., 114A, 114B) includes functionality to select the encryption algorithm using the algorithm selector table (e.g., 110A, 110B) (discussed below).

Continuing with the security application (e.g., 106A, 106B), although not shown in FIG. 1A, the security application (e.g., 106A, 106B) may also include an interface. The interface includes functionality to connect to entities that are not a part of the security application (e.g., 106A, 106B). For example, the interface may correspond to an application programming interface (API) and/or a user interface. The security application (e.g., 106A, 106B) may be configured to communicate with other applications executing on the same or different computing devices using the API. Thus, for example, the API of member A's security application (106A) may include functionality to communicate via the network with member B's security application (106B). As another example, the API may include functionality to receive an encrypted format of a file and provide a clear text format of the file to another application executing on member A (e.g., 104A, 104B). Conversely, the API may include functionality to receive, from another application on member A (106A), a clear text format of a file and provide an encrypted format of the file to another application executing on member A (106A) on member B (106B).

In one or more embodiments of the invention, the user interface includes functionality to communicate with a user of the member (e.g., 104A, 104B). Specifically, the user interface includes functionality to receive input from the user and/or provide information to the user. The user interface may include hardware and/or software components, such as information boxes, menu buttons, drop down boxes, input boxes, hardware lights, hardware buttons, and/or other user interface components.

Continuing with FIG. 1A, each of the members (e.g., 104A, 104B) may include a secrets repository (e.g., 108A, 108B). In one or more embodiments of the invention, the secrets repository (e.g., 108A, 108B) is any type of storage unit and/or device (e.g., a file system, file, collection of files, database, collection of tables, external data store (e.g., a USB drive, etc.) and/or any other storage mechanism) for storing secrets. Further, the secrets repository (e.g., 108A, 108B) may include multiple different storage units and/or devices.

Secrets in the secrets repository (e.g., 106A, 106B) correspond to data known only to the members of the group. Further, each member of the group may independently generate the secrets using an n-bit generator (e.g., 112A, 112B). Thus, the secrets may correspond to one or more message digests, or a portion thereof. Generating the secrets is discussed below and in FIGS. 2 and 3.

Secrets in the secrets repository (e.g., 106A, 106B) are each associated with a given group and may be further organized according to type of communication in accordance with one or more embodiments of the invention. For example, secrets used for encryption in a chat session may be different than secrets used for encryption in an email communication. Alternatively or additionally, the secrets may be organized based on the clear text file format of a file to be encrypted. For example, secrets used to encrypt portable document formatted (PDF) files may be different than secrets used to encrypt extensible markup language (XML) files.

In one or more embodiments of the invention, each secret is a shared secret. A shared secret is information known by all members of the group. A shared secret may include a static secret, a dynamic secret, or both a static and a dynamic secret. The static secret may remain unchanged throughout the lifetime of the group in accordance with one or more embodiments of the invention. For example, the static secret may be used to recover secure communications by providing a new encryption key when the members of the group lose synchronization with regards to the dynamic secret. In contrast, the dynamic secret may periodically change, such as at the end of each communication session or prior to beginning a communication session.

In one or more embodiments of the invention, a communication session may be a set of related communications (e.g., related short messaging service messages (SMS), related emails, WebEx, chat messages, or other related communications). Alternatively, or additionally, a communication session may correspond to a set of communications starting at a first time and having a duration of a pre-defined amount of time. The pre-defined amount of time may be defined, for example, according to the amount of time after the last communication is sent and/or received.

Continuing with the discussion of the member (e.g., 104A, 104B), each member (e.g., 104A, 104B) includes an algorithm selector table (e.g., 110A, 110B). FIG. 1B shows an example algorithm selector table (110) in accordance with one or more embodiments of the invention.

As shown in FIG. 1B, an algorithm selector table (110) is a logical association between an algorithm identifier (e.g., 116M, 116N) and a corresponding encryption algorithm (e.g., 118M, 118N) (discussed above). The algorithm identifier may be, for example, a numeric, binary, or another such value. In one or more embodiments of the invention, all algorithm identifiers in a range are present. For example, the algorithm identifier may be a range of integers (e.g., 0 . . . 15), a sequence of binary values (e.g., 000, 001, 010, . . . 111). Further, the same encryption algorithm (e.g., 118M, 118N) may be associated with multiple algorithm identifiers (e.g., 116M, 116N). For example, "0" may correspond to AES, "1" may correspond to Triple DES, "2" may correspond FEAL, and "3" may correspond to Triple DES.

Further, in one or more embodiments of the invention, the association between the encryption algorithm identifiers (e.g., 116M, 116N) and the encryption algorithms (e.g., 118M, 118N) is not based on a pre-defined ordering of encryption algorithms (e.g., 118M, 118N). Specifically, the association may be randomly defined.

The use of the term, "table", is only to denote a logical representation; various implementations of the algorithm selector table may be used without departing from the scope of the invention. For example, the algorithm selector table may be implemented in computer instructions using a series conditional statements. Specifically, when a conditional statement is satisfied, the code corresponding to the implementation of the encryption algorithm is executed. By way of another example, the algorithm selector table (110) may be implemented as a data structure that associates the consecutive encryption algorithm identifiers (e.g., 116M, 116N) with identifiers used by the security application for each of the encryption algorithms. The above are only a few examples of possible implementations for the algorithm selector table (110) and not intended to limit the scope of the invention.

Further, all members associate the same encryption algorithm identifiers (e.g., 116M, 116N) with the same corresponding encryption algorithms (e.g., 118M, 118N). For example, if one member associates "0" with AES, "1" with Triple DES, "2" with FEAL, and "3" with Triple DES, then the remaining members associates "0" with AES, "1" with Triple DES, "2" with FEAL, and "3" with Triple DES. Further, all members may or may not use the same implementation of the algorithm selector table (110).

In one or more embodiments of the invention, the algorithm selector table (110) includes separate entries for each encryption algorithm and key length pair. In one or more embodiments of the invention, the encryption module may identify the encryption algorithm from the algorithm selector table (110) and use the key length associated with the encryption algorithm to extract the appropriate number of bits for the encryption key. For example, an entry may exist for Blowfish with an encryption key length 256 bits and a separate entry may exist for Blowfish with an encryption key length of 384 bits. In the example, if the first entry is specified in the algorithm selector bits of the message digest (discussed below), then 256 bits are extracted from the message digest(s) for the encryption key. Alternatively, in the example, if the second entry is specified, then 384 bits are extracted from the message digest for the encryption key.

Further, each entry in the algorithm selector table (110) may include a starting bit value. The starting bit value may be used to identify a first secret to use in the secrets repository or a starting bit for the encryption key in the message digest.

Alternatively, although not shown in FIG. 1A-1B, the system may include a key length table. The key length table may specify an identifier with a corresponding encryption key length. Similar to the algorithm selector table, multiple different possible implementations of the key length table may be used without departing from the scope of the invention. Further, all members of the group have the associations between key length identifiers and key lengths, but may not have the same implementation of key length table. For example, "1" may be associated with "256 bits", 2 may be associated with "128 bits", etc.

In one or more embodiment of the invention, when a key length table is used, the algorithm selector table may be used to specify the encryption algorithm, and the key length table may be used to specify the number of bits in the encryption key. Specifically, a key length field (discussed below) in the message digest may index the corresponding entry in the key length table. In one or more embodiments of the invention, if the specified encryption algorithm does not allow for variable key length, then the key length field in the message digest is ignored.

FIGS. 2-5B show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel.

Figure 2:
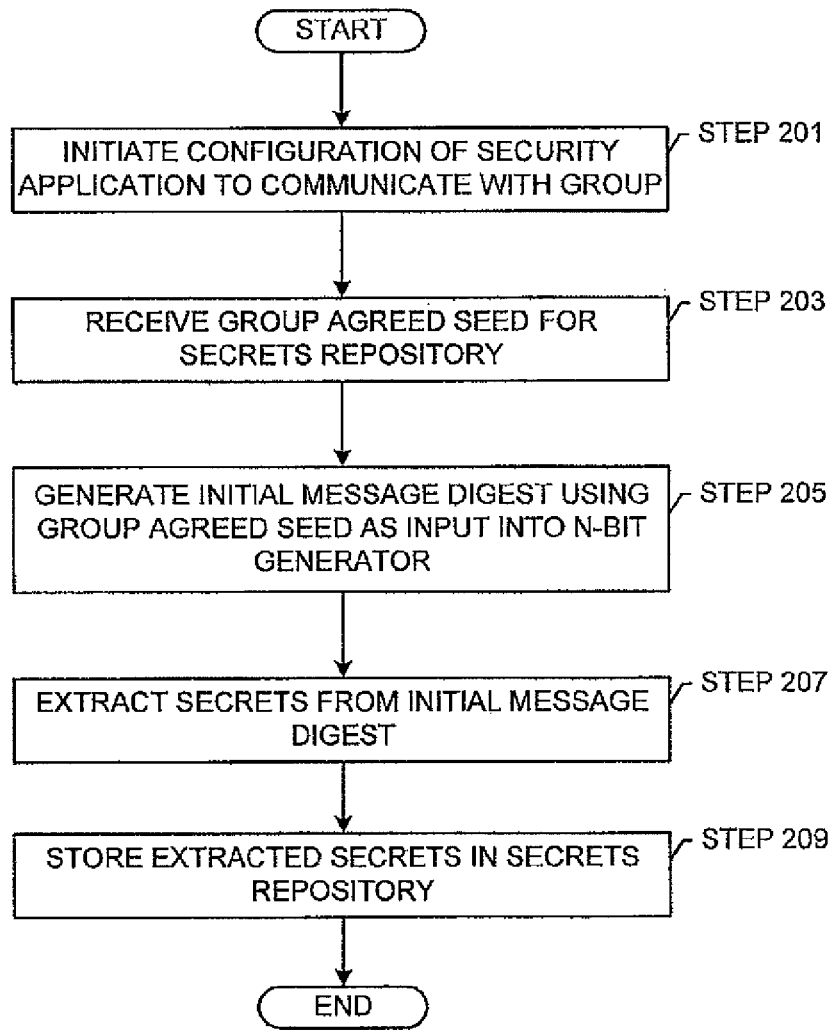

FIG. 2 shows a flowchart for creating an initial message digest using a group agreed seed in accordance with one or more embodiments of the invention. In Step 201, the security application is initiated for communication with the group. In one or more embodiments of the invention, a user of a computing device may initiate the security application by opening the security application, providing the user's credentials (e.g., user name and password and/or other authentication credentials), and submitting information about members of the group. For example, the information submitted may include each user's name, nickname, contact information, and/or secure communication channel information for communicating with the member(s). Rather than a user initializing the security application, the security application may be remotely administered by another member of the group. For example, consider the scenario in which the group includes a bank computing device and a computing device of the user having an account at the bank. The member may be remotely initialized by the bank computing device. Alternatively, the computing device of the use may start the initialization of its security application and then turn control over to bank computing device to complete the configuration, such as if the member is temporarily directly connected to the bank computing device. In such an example scenario, the member may be removed from the bank computing device and redirected to an administrator for remote configuration.

In Step 203, a group agreed seed is obtained. Specifically, the members of the group and/or their corresponding users communicate and agree on a group agreed seed. If the users communicate and agree on the group agreed seed, then the user may submit the group agreed seed to the security application. In such embodiments, the security application obtains the group agreed seed from the member. If the members communicate with the other members regarding the group agreed seed, then the member obtains the group agreed seed as the one agreed upon. The group agreed seed may be any password, passphrase, or series of characters. For example, the group agreed seed may be "the cow jumped over the moon," "#8$#DsaVA(@12w@," or any other collection of characters (e.g., symbols and/or alphanumeric characters). Users of the members (or a program executing on the members) may communicate the group agreed seed in person, over the phone, via postal mail, or using any other alternative communication channel. Each member may independently submit the group agreed seed to the security application. When prompted, the user of each member may enter the group agreed seed in a field of the user interface of the security application. Alternatively, a process executing on the member may provide the group agreed seed to the security application.

In Step 205, an initial message digest is generated using the group agreed seed as inputs to the n-bit generator. For example, the encryption module may call the instance of the n-bit generator using the group agreed seed as the input value.

In Step 207, secrets are extracted from the initial message digest. Specifically, the security application identifies each portion of the message digest relating to a secret. The following examples are not intended to limit the scope of the invention. Turning to an example, in a 512-bit message digest, bits in bit positions 0-127 may correspond to the static secret, bits in bit positions corresponding to 128-383 may correspond to the dynamic secret and the final 128 bits may correspond to discard bits that remain unused. In the example, the security application extracts the static secret by obtaining the first 128 bits of the message digest and extracts the dynamic secret by obtaining the next 256 bits. As discussed, the above is only an example. For example, the ordering of the static secrets, dynamic secret, and discard bits may be different from the previous example, the discard bits may be omitted, the static secret or a portion thereof may be in different message digests, the dynamic secret or a portion thereof may be in different message digests, or one of the secrets may be omitted. In one or more embodiments of the invention, each security application extracts the same bits for each of the secrets. Thus, each member of the group generates the same set of secrets.

As another example for extracting secrets, bits in the message digest may indicate the starting position of each of the secrets. For example, the first four bits low order or least significant of the message digest may be used as shift bits defining the start of a secret. In such an example, the first bit of a secret may start following the shift value. By way of an example, if the shift bits in the message digest is "0001" (or one in base 10), then the secret starts at bit position two. As another example, if the shift bits is "1000" (or eight in base 10), the secret starts a bit 9.

Additional secrets may be generated for the group by repeating Steps 205 and 207 using the initial message digest and subsequent message digests as an input to the n-bit generator. Alternatively, or additionally, Steps 205 and 207 may be repeated multiple times performed to generate new secrets. For example, each subsequent time may use, as input, the message digest from the previously time. Alternatively, or additionally, additional secrets may be generated by repeating Steps 203-205 in which new group agreed seeds are used.

In Step 209, the extracted secrets are stored in the secrets repository. In one or more embodiments of the invention, when the extracted secrets are stored, the extracted secrets are associated with the group. For example, extracted secrets for the same group may be stored in the file within the appropriate secrets repository. As another example, extracted secrets for the same group may be associated with a unique group identifier. Further, in one or more embodiments of the invention, the security application associates a secret identifier with each of the secrets. The secret identifier associated with the same secret is identical across all members of the group. For example, the secret identifier may be a sequential numeric identifier designating the order in which the particular secret(s) was generated in relation to other secrets. In the example, the first generated secrets may be associated with one, the second generated secrets may be associated with two, etc.

Additionally, the security applications for all members of the group may be configured to associate the same secrets with the same type of communications and/or the same types of applications. For example, the security applications may be configured to associate the first four generated secrets with email communications, the next six generated secrets with video conferencing applications, etc.

After storing the secrets in the secrets repository, the secrets may be used to create an encryption key for encrypting communications. Generating encryption keys for encrypting communications is discussed in FIGS. 4A and 4B below. Further, because all members of the group generate the same secrets, the resulting encryption keys are identical across all members of the group in accordance with one or more embodiments of the invention.

Figure 3:
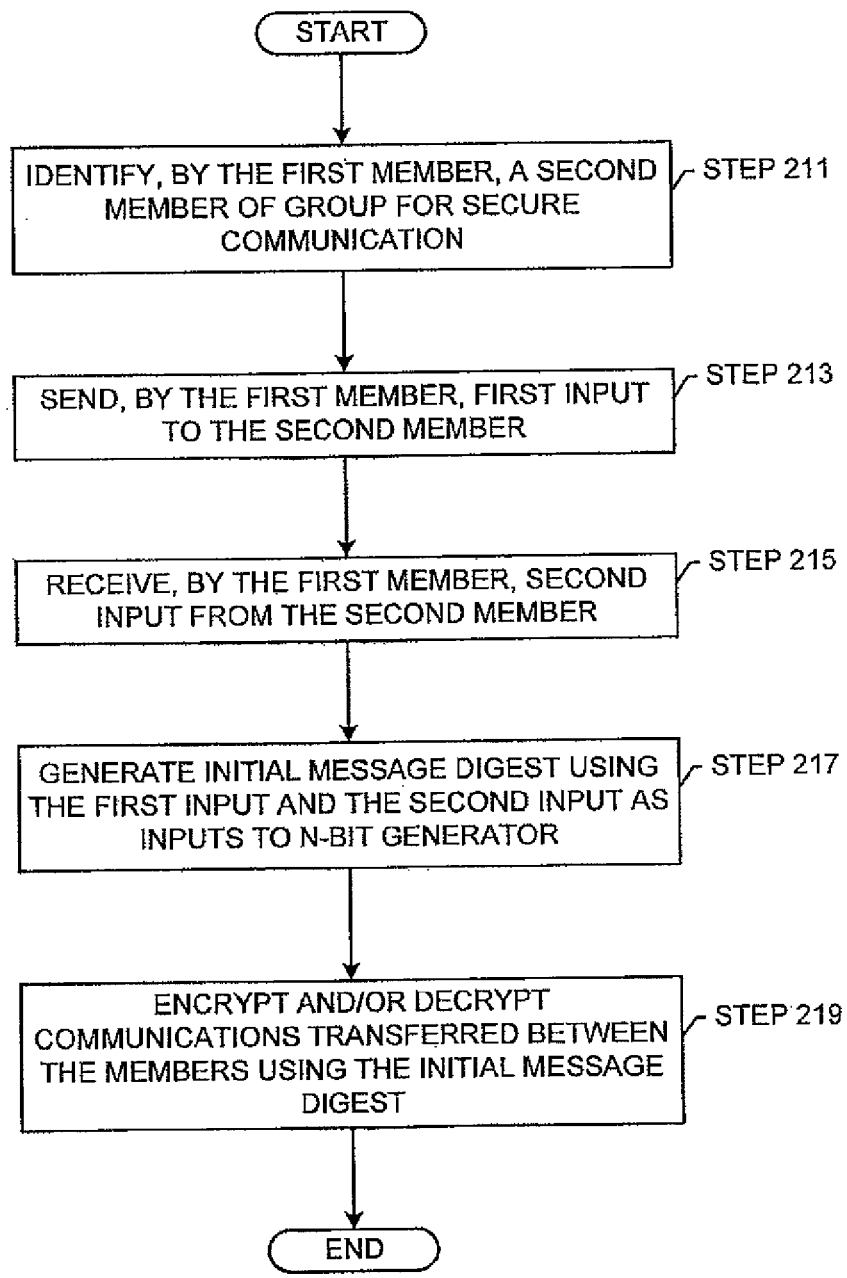

FIG. 3 shows a flowchart for generating an initial message digest by each member of the group providing input. In one or more embodiments of the invention, the members of the group do not have shared secrets prior to performing the flowchart discussed below. Although FIG. 3 is shown and discussed below from the prospective of one of the members of the group, the steps discussed below are performed by each member of the group so that all members generate the same initial message digest. Further, although FIG. 3 shows an example of a two member group, additional members may be added without departing from the scope of the invention.

In Step 211, a first member of the group identifies a second member of the group. Specifically, a member of the group commences communication with the group. Below are a few examples of how communication may be commenced amongst the members of the group.

In a first example, the security application executing on a first member may receive a request from a user to contact the second member of the group. The request from the user may include a nickname if information about the second member is pre-initialized in the security application. Alternatively, the request may include the user of the second member's name, nickname, contact information, and/or secure communication channel information for communicating with the second member. The first member may contact the second member using information in the request and/or pre-configured secure connection information.

In another example, the first member's security application may receive a request for connection from the second member's security application based on a request of a user of the second member. In response, with or without input from the user of the first member, the first member's security application may initiate communication with the second member's security application.

In Step 213, the first member of the group sends a first input to the second member of the group. The first input may be a non-deterministic randomly generated challenge, a passphrase, or another piece of data. Further, if the second member has a public key, the first member may obtain the public key from the public key repository and encrypt the first input with the public key. Alternatively, the first input may be sent in clear text. Although not shown in FIG. 2, the first member sends the same first input to each member of the group.

In Step 215, the first member of the group receives the second input from the second member. If the first member has a public key, then the second input may be in an encrypted format. The first member may decrypt the second input using the first member's private key.

In Step 217, an initial message digest is generated by the first member and the second member using the first input and the second input as inputs to the n-bit generator. Specifically, the encryption module calls the n-bit generator with the first input and the second input. Because both the first member and the second member each use the first input and the second input on the same instance of the n-bit generator, the resulting initial message digest is the same for the first member and the second member.

As discussed above, the steps discussed above may be performed by the security application with or without input from a user. For example, the encryption module of the security application may receive the second input and decrypt the second input autonomously. Thus, the encryption module may perform the aforementioned steps without notification or requiring input to/from a user.

In Step 219, communications between the members are encrypted and decrypted using the initial message digest. The communication may include, for example, files, entire messages, attachments, or any other data sent between the members of the group.

From the initial message digest, shared secrets may be extracted. The shared secrets may be stored in the secrets repository and used for many different types of communications. For example, the static secret may be used to create encryption solutions to encrypt communications in a chat session, emails, files, or other types of communications. By way of another example, the dynamic secret may be used with or without the static secret when the dynamic secret remains unchanged between when the encryption key is created and the communication is decrypted (e.g., a chat session, emails, or other types of communications).

Figure 4A:
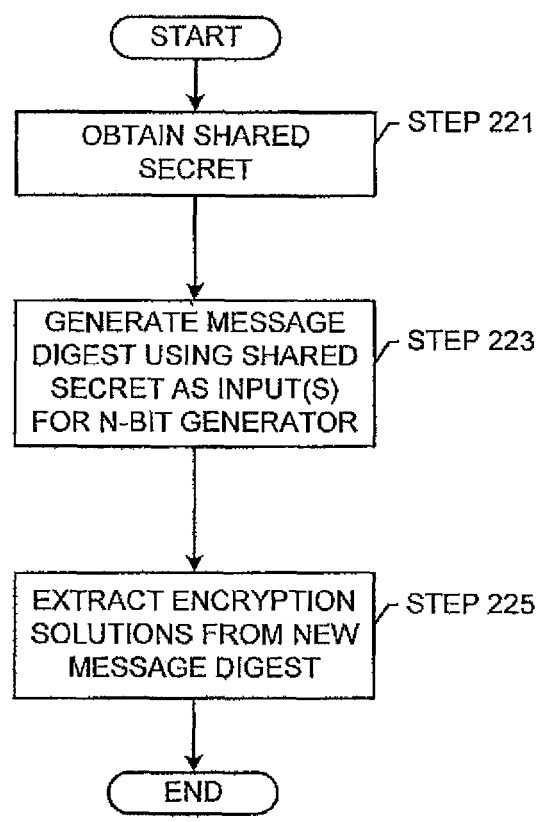
Figure 4B:
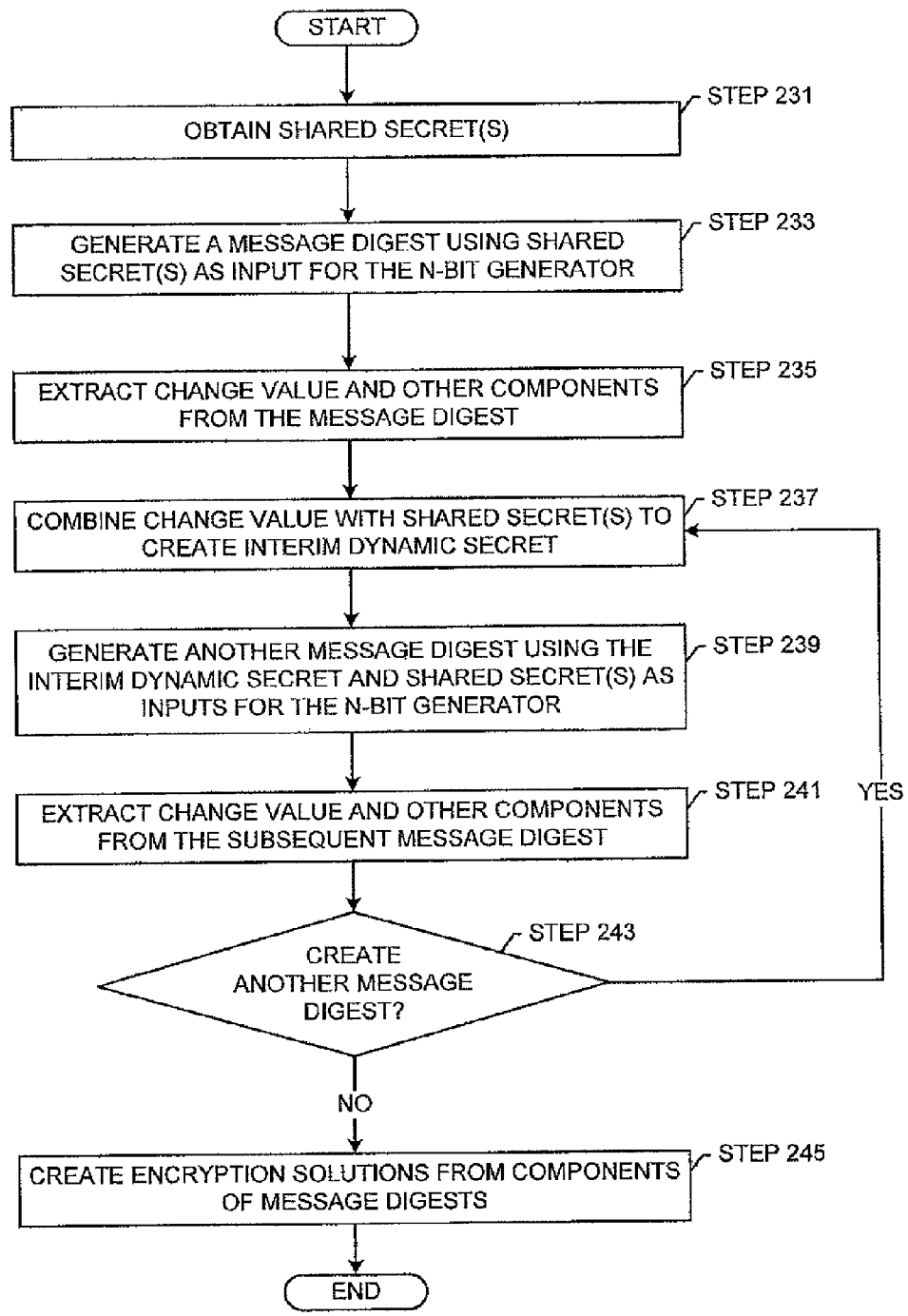

FIGS. 4A and 4B show flowcharts for using the initial message digest to generate an encryption solution. As shown in FIG. 4A, in Step 221, shared secret(s) are obtained. Specifically, the shared secret may be extracted from an initial message digest and/or may be obtained from the secrets repository.

Continuing with FIG. 4A, in Step 223, a new message digest is generated using the shared secret(s) as inputs for the n-bit generator. For example, the encryption module may call the n-bit generator and pass the parameters of the shared secret(s). The new message digest may be interpreted as, for example, any of the example message digests discussed above and shown in FIGS. 6 and 7.

In Step 225 of FIG. 4A, encryption solutions are extracted from the resulting message digest. Extracting the encryption solutions may include the encryption module identifying the bit positions corresponding to each encryption solution and separately storing the series of bits in the identified bit positions as the encryption solution. The storing of the series of bits may be temporary, such as in random access member (RAM) in accordance with one or more embodiments of the invention. Each encryption solution may be further divided into the components of the encryption solution. For example, the encryption key, algorithm selector bits, key length and other components of the message digest may be extracted. Extracting the encryption key may be performed similar to extracting the secrets as discussed above with reference to Step 207 in FIG. 2. For example, similar to using the shift bits to designate the start of a secret, the shift bits may be used to designate the start of an encryption key.

FIG. 4B shows another example flowchart for using the initial message digest. Specifically, FIG. 4B shows an example for generating multiple message digests, where each message digest includes some of the components for encrypting a communication. In Step 231, the shared secret(s) are obtained. Obtaining the shared secret(s) may be performed as discussed above.

In Step 233, a message digest is generated using the shared secret(s) as inputs for the n-bit generator. Generating the message digest may be performed in a similar manner to that discussed above with reference to Step 223 in FIG. 4A.

In Step 235, the change value and other components are extracted from the message digest. Extracting the components may be performed in a manner similar to the extraction of the encryption key as discussed above in Step 225 of FIG. 4A. The other components that are extracted may include, for example, the most significant bits of the encryption key, the least significant bits of the encryption key, the algorithm selector bits, etc for one or more encryption solutions.

In Step 237 of FIG. 4B, the change value is combined with the shared secrets to create an interim dynamic secret. Combining the change value with the shared secrets may be performed, for example, by a bit shuffler. Specifically, any of the operations discussed above with respect to the bit shuffler may be performed to combine the change value with the shared secrets. In one or more embodiments of the invention, a number is added to the change value or result to account for a possibility that the change value is zero. By way of example and not limitation, the combination may be the change value XOR'd with the dynamic secret plus one.

In Step 239, another message digest is generated using the interim dynamic secret and the shared secrets as inputs to the n-bit generator. Step 239 may be performed, for example, in a manner similar to the above discussion with reference to Step 233. In one or more embodiments of the invention, rather than performing Step 237 to create an interim dynamic secret and then performing Step 239 to generate the subsequent message digest using the interim dynamic secret, the subsequent message digest may be generated using the change value, the dynamic secret, and the shared secret as inputs into the n-bit generator.

In Step 241, a change value and other components are extracted from the subsequent message digest in accordance with one or more embodiments of the invention. Extracting a change value and the other components may be performed similar to the above discussion with reference to Step 235.

In Step 243, a determination is made whether to create another message digest. In one or more embodiments of the invention, each security application is configured to create an identical number of message digests. Additional message digests may be generated to create additional bits for an encryption key and to create additional components.

If a determination is made to create an additional message digest, then the steps repeat starting with Step 237. In Step 237, the change value extracted in Step 241 is used with the shared secrets to create a new interim dynamic secret. Alternatively, rather than using the shared secrets for subsequent message digests, the previously created interim dynamic secret may be used.

Alternatively, if a determination is made not to create another message digest, encryption solutions are created from the components of the message digests in Step 245. For example, the least significant bits of the encryption key may be combined with the most significant bits of the encryption key to create a single encryption key.

The encryption solutions may be used to encrypt and decrypt communications as discussed below and in FIG. 4C. Encrypting a communication may be performed for example, by accessing the algorithm selector table to identify the encryption algorithm corresponding to the algorithm selector bits in the message digest. The communication to be encrypted is encrypted by applying the identified encryption algorithm with the encryption key to the communication. The resulting encrypted communication may be sent to the members and/or stored (e.g., stored on a local or remote storage device).

Alternatively, if a determination is made not to create another message digest, encryption solutions are extracted from the components of the message digests in Step 245 or next. For example, in one encryption solution, the least significant bits of the encryption key may be combined with the most significant bits of the encryption key to create a single encryption key.

Figure 4C:
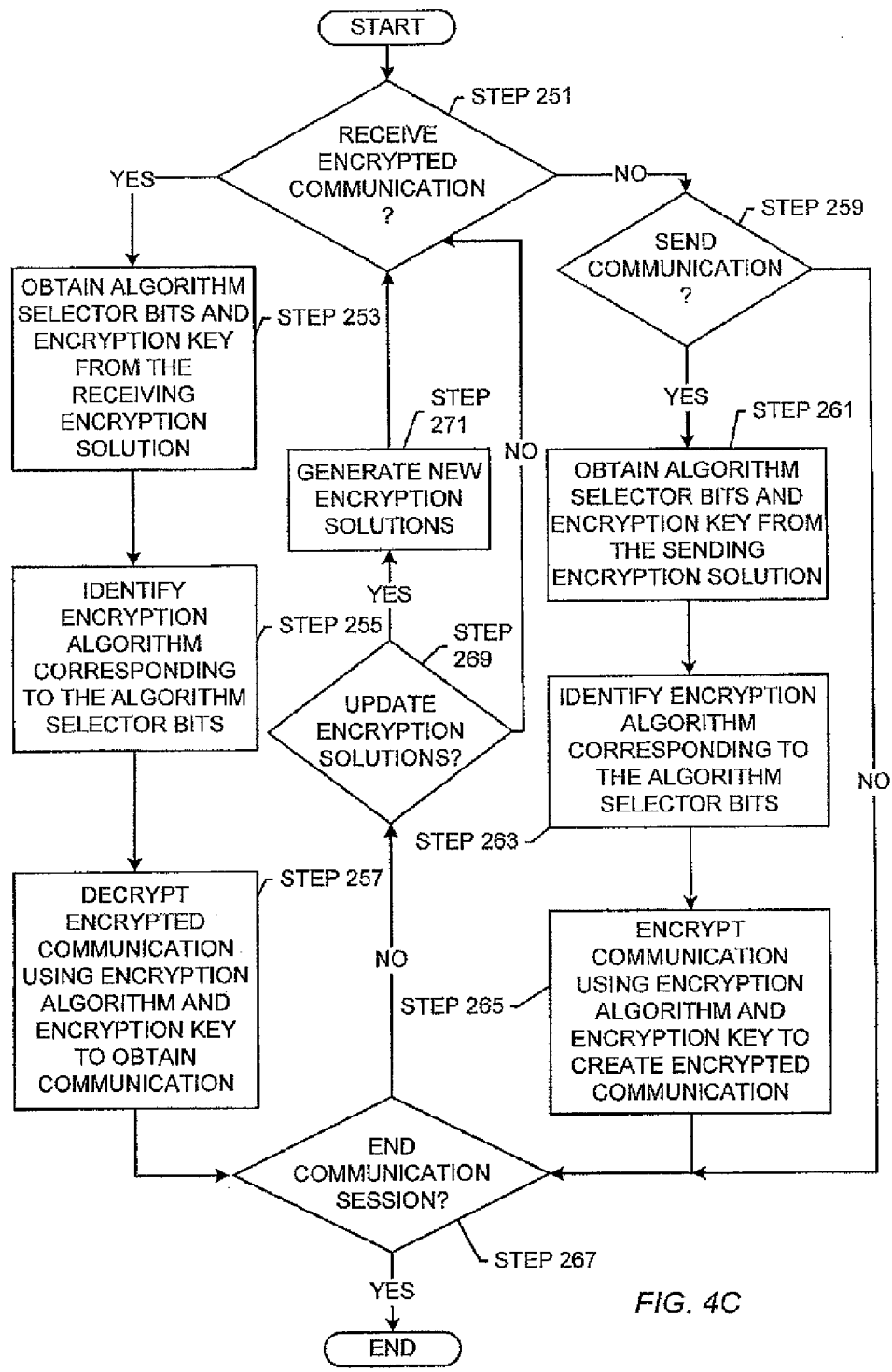

FIG. 4C shows a flowchart for using the encryption solutions to send and receive communications between members of the group. Although FIG. 4C is shown and discussed from the perspective of a member of the group, other members may perform similar steps to send and receive communications. Further, as discussed above, although the flowcharts are described sequentially, steps may be performed in parallel. For example, while a received encrypted communication is decrypted, another communication may be encrypted for sending.

In Step 251, a determination is made whether an encrypted communication is received. If an encrypted communication is received, in Step 253, algorithm selector bits and an encryption key are obtained from the receiving encryption solution. If in Step 253, more than one receiving encryption solution exists, then the receiving encryption solution may be first identified. For example, the receiving encryption solution may be a solution associated with the sender. In the example, the sender of the communication is identified, such as from the information in the communication. Based on the sender, the encryption solution is identified. From the encryption solution, the algorithm selector bits and encryption key is obtained.

In Step 255, an encryption algorithm corresponding to the algorithm selector bits are identified. In one or more embodiments of the invention, identifying the encryption algorithm includes obtaining the numeric format of the algorithm selector bits and using the numeric format to identify a matching encryption algorithm identifier in the algorithm selector table. The encryption algorithm associated with the matching algorithm identifier is selected.

In Step 257, the received encrypted communications is decrypted using the identified encryption algorithm and the encryption key to obtain the clear-text format of the communication. Specifically, the encryption module applies the encryption algorithm to the communication using the encryption key.

Returning to Step 251, a determination may be made to send a communication. In Step 259, a determination is made whether to send a communication, more specifically, an encrypted communication. If a communication is to be sent, in Step 261, algorithm selector bits and an encryption key are obtained from the sending encryption solution. If in Step 261, more than one sending encryption solution exists, then the sending encryption solution may be first identified. For example, the sending encryption solution may be a solution associated with the receiver of the communication. In the example, the receiver of the communication is identified. Based on the receiver, the encryption solution is identified. From the encryption solution, the algorithm selector bits and encryption key are obtained.

In Step 263, an encryption algorithm corresponding to the algorithm selector bits are identified. In one or more embodiments of the invention, identifying the encryption algorithm includes obtaining the numeric format of the algorithm selector bits and using the numeric format to identify a matching encryption algorithm identifier in the algorithm selector table. The encryption algorithm associated with the matching algorithm identifier is selected.

In Step 265, the communication is encrypted using the encryption algorithm and the encryption key to obtain the encrypted communication. Specifically, the encryption module applies the encryption algorithm to the communication using the encryption key. The encrypted communication may then be sent to the receiver. Although not shown in FIG. 4C, the receiver of the communication may use Steps 253-257 to decrypted the communication using a copy of the encryption solution identified in Step 261.

Continuing with FIG. 4C, in Step 267, a determination is made whether to end the communication session. If the determination is made not to end the communication session, then a determination may be made to update the encryption solutions in Step 269. For example, during a communication session, the members of a group may agree to change the encryption key and/or the secrets. For example, the agreement may be based on a signal passed between the members when one of the members suspects that the encryption key is compromised. As another example, the agreement may be based on a pre-agreed period at which a new encryption key is generated. For example, the members may agree that a new encryption key should be generated every five minutes, with every 20 sessions, based on the amount of data exchanged, etc.

If a determination is made to update encryption solutions, then in Step 271, new encryption solutions are generated. By updating encryption solutions, nefarious users or computer system may have difficulty using the correct encryption solution for the correct communication. New encryption solutions may be generated during a communication using the steps discussed in FIG. 5A below. Alternatively, if a determination is made not to update encryption solutions, then another determination is made whether an encrypted communication is received in Step 251.

Figures 5A, 5B:
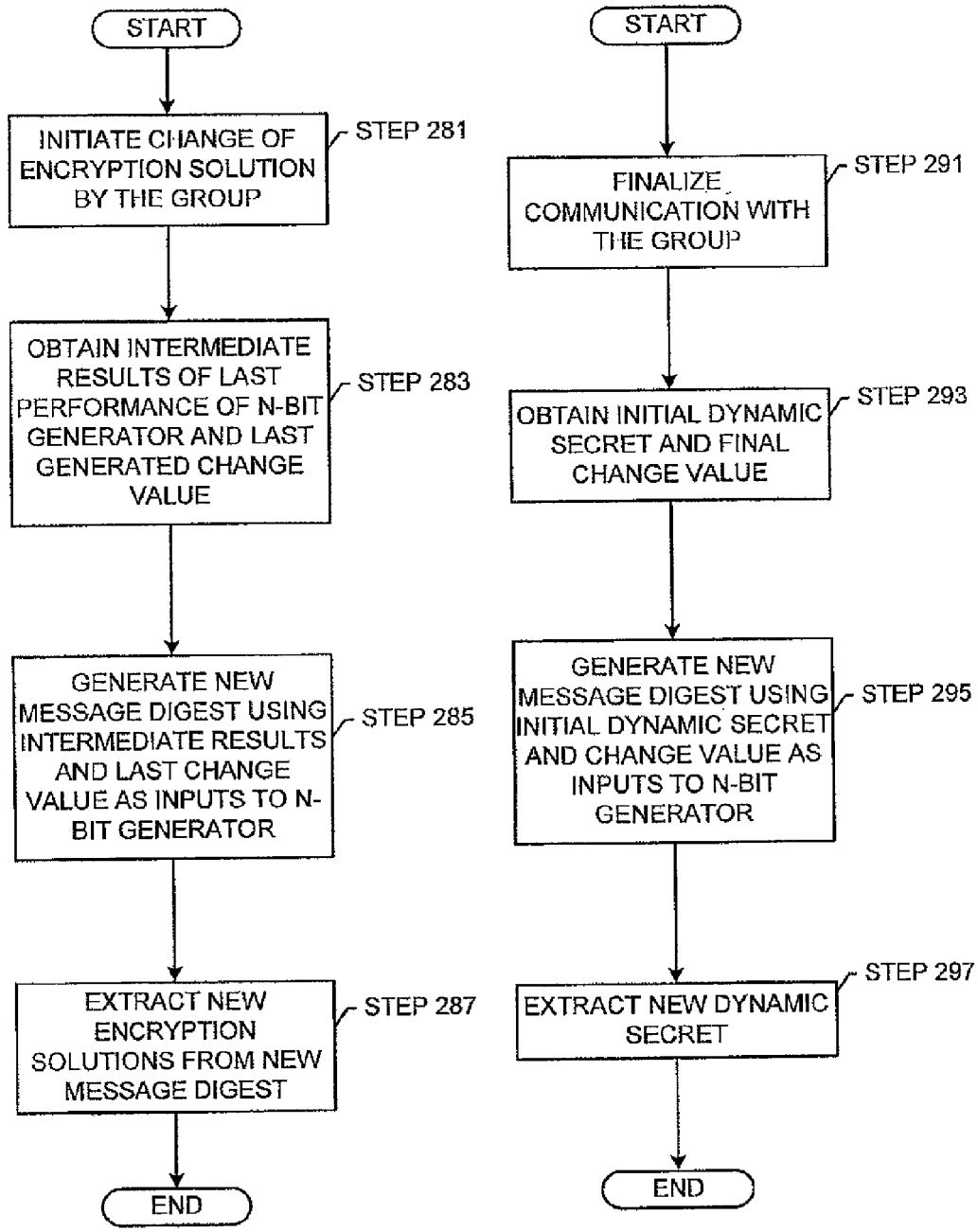

In Step 267, if the determination is made to end the communication session, then the communication session may be finalized. For example, members of the group may communicate to indicate that the communication session is finished. If the communication session ends successfully, then the members may decide to update secrets in the secrets repository. FIG. 5B below discusses updating the secrets in the secrets repository.

FIG. 5A shows a flowchart for changing encryption solutions. In Step 281, a change of encryption solution is initiated by the group or one of the members thereof. As discussed above, the initiation may be based on a message, a pre-agreed period, etc.

In Step 283, intermediate results of the last performance of the n-bit generator and the last generated change value are obtained. As discussed above, the intermediate results may correspond to the output of the bit shuffler prior to performing the hash function. Further, each member may extract the change value from the last generated message digest.

In Step 285, each member generates a new message digest using the intermediate results and the last change value as inputs to the n-bit generator. Generating the new message digest may be performed as discussed above with reference to Step 239 in FIG. 4B. Similar to the discussion of FIG. 4B, additional message digests may be generated without departing from the scope of the invention.

In Step 287, a new encryption solution is extracted from the message digest(s). Extracting the new encryption solution may be performed as discussed above with reference to Step 225 of FIG. 4A or Step 245 in FIG. 4B. After the new encryption solution is extracted, the new encryption solution may be used to encrypt and decrypt communications between the members of the group.

FIG. 5B shows an example flowchart for changing the secrets at the end of a communication session in accordance with one or more embodiments of the invention. In Step 291, a communication session is finalized with the group. For example, the group members may send a message ending the communication session, such as a disconnect. Each member may wait until the member receives confirmation from all other members of the group.

In Step 293, the initial dynamic secret and the final change value used in the communication session are obtained. For example, the initial dynamic secret may be the secret generated in the initial message digest or a secret stored in the secrets repository. The final change value may correspond to the last generated change value. For example, the final change value may be obtained as discussed above with reference to Step 283 in FIG. 5A.

Continuing with FIG. 5B, in Step 295, a new message digest is generated using the initial dynamic secret and the final change value as inputs to the n-bit generator. For example, the steps discussed in FIGS. 4A and 4B may be performed one or more times to generate the message digests. In Step 297, the new dynamic secret is extracted from the new message digest. The new dynamic secret may replace the initial dynamic secret in the secrets repository. Specifically, each member of the group may store the new dynamic secret in their corresponding secrets repository. Because each member generates and stores the same new dynamic secret, the members use the same secrets in the next communication session. Alternately, the initial dynamic secret may be combined with the final change value and then a constant added to the result. The final result may replace the stored dynamic secret.

Figure 6:
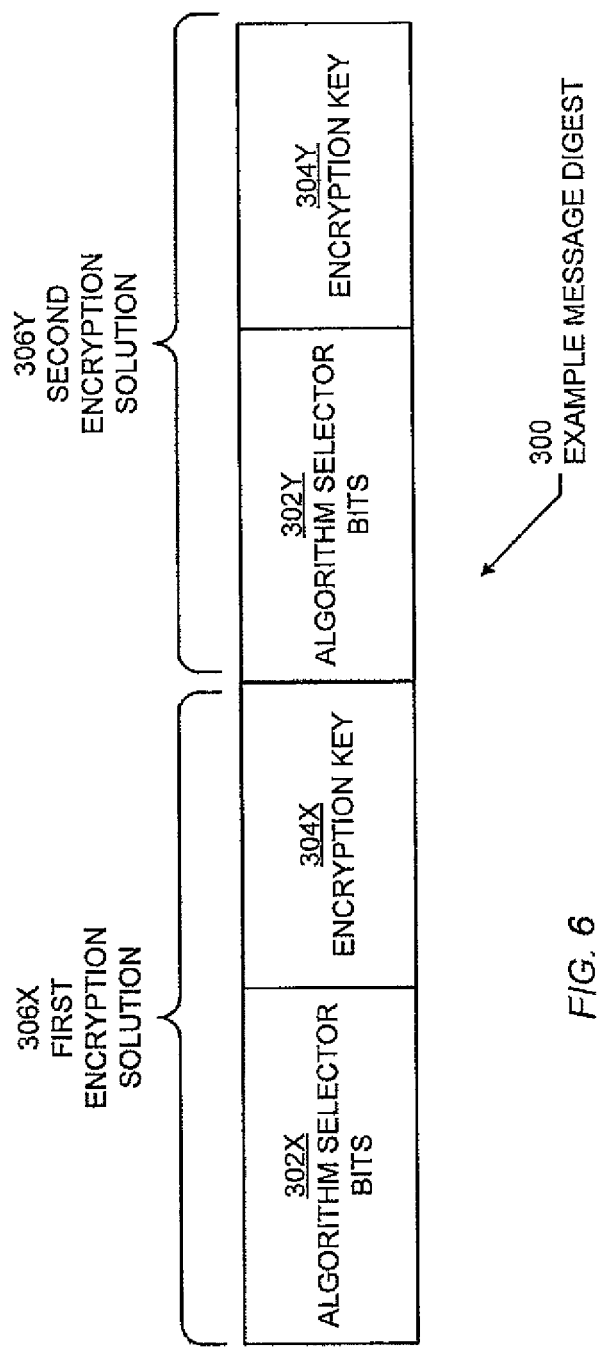
Figure 7:
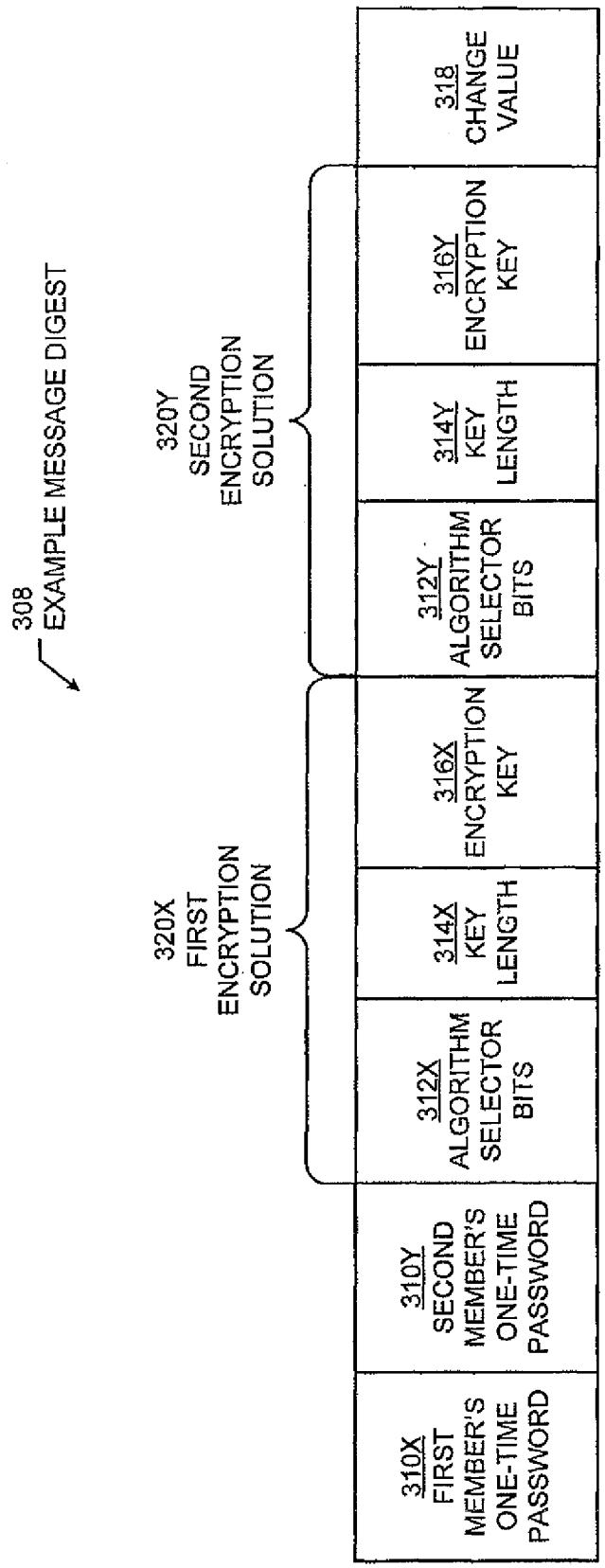

FIGS. 6-8 show example message digests in accordance with one or more embodiments of the invention. In the example message digests, only two encryption solutions are shown, additional encryption solutions may be generated and in the message digest without departing from the scope of the invention. The following example message digests are for example purposes only and not intended to limit the scope of the invention.

FIG. 6 shows an example message digest in accordance with one or more embodiments of the invention. As shown in FIG. 6, the message digest (300) may include algorithm selector bits (e.g., 302X, 302Y) and an encryption key (e.g., 304X, 304Y) for each encryption solution (e.g., 306X, 306Y). In one or more embodiments of the invention, the algorithm selector bits (e.g., 302X, 302Y) correspond to the series of bits that are in pre-defined bit positions in the message digest. In one or more embodiments of the invention, the bit position corresponding to the algorithm selector bits (e.g., 302X, 302Y) are known only to the security application. For example, the bit positions may be purposefully hidden from a user of the member.

As discussed above, the algorithm selector bits (e.g., 302X, 302Y) correspond to the bit value of the encryption algorithm identifier in the algorithm selector table. In one or more embodiments of the invention, because each group has the same algorithm selector table, generates the same message digest, and uses the same bits in the message digest as the algorithm selector bits, the members of the group all know the algorithm for encrypting and decrypting the communication. Further, each time a message digest having algorithm selector bits is generated, the encryption algorithm may change from the previously generated encryption algorithm. Specifically, by including the algorithm selector bits in the message digest, not only may the encryption key change, but also the encryption algorithm. Thus, a nefarious user or computer system would have to match both the encryption algorithm with the encryption key with the communication to decrypted any encrypted communication.

The encryption key (e.g., 304X, 304Y) is a key used by the encryption algorithm to encrypt and decrypt one or more communications. Because all members use the same instance of the n-bit generator to generate the message digests, the encryption key generated by each of the members is the same. Thus, the encryption key does not need to be communicated between the members. Moreover, the encryption key may be stored in the security application and not provided through any interface to any user. Thus, users that leave the group remain unaware of the encryption key used to encrypt the data.

The message digest may include alternative or additional components. FIG. 7 shows an example message digest (308) in accordance with one or more embodiments of the invention. As shown in example FIG. 7, the message digest (308) may include a first member's one-time password (310X), a second member's one-time password (310Y), algorithm selector bits (e.g., 312X, 312Y), a key length (e.g., 314X, 314Y), an encryption key (e.g., 316X, 316Y), and a change value (318). The first member's one-time password (310X), algorithm selector bits (312X), key length (314X), and the encryption key (316X) may correspond to a first encryption solution (320X) for the first member. The second member's one-time password (310Y), algorithm selector bits (312Y), key length (314Y), and the encryption key (316Y) may correspond to a first encryption solution (320Y) for the second member. The components of the example message digest (308) are discussed below.

The first member's one-time password (310X) is a series of bits generated by the n-bit generator for the second member to authenticate the first member. Specifically, because both the first member and the second member generate the same message digest (e.g., example message digest (308)), the first member's one-time password (310X) is the same for the first member and the second member. Accordingly, if the first member's one-time password (310X) that the first member sends to the second member is identical to the second member's generated first member's one time password, then the second member knows that the first member is authentic. Specifically, the first member knows that the second member received the same input and had an n-bit generator that was capable of performing the same operations. Further, in one or more embodiments, once the first member and second member passwords have been confirmed, an extremely high probability exists that the other corresponding bits of the message digest also match between systems.

Similarly, the second member's one-time password (310Y) is a series of bits generated by the n-bit generator for the first member to authenticate the second member. Specifically, the second member sends the second member's one-time password (310Y) to the first member. If the second member's one-time password (310Y) that the second member sends to the first member is identical to the first member's generated second member's one-time password, then the first member knows that the second member is authentic. Specifically, the second member knows that the first member received the same input and had an n-bit generator that was capable of performing the same operations and has the same message digest.

In one or more embodiments of the invention, prior to sending the one-time passwords, the one-time passwords are encrypted using an encryption algorithm and an encryption key. In such embodiments, the one-time passwords are sent encrypted. The receiver may encrypted their generated one-time password and compared the encrypted generated one-time password with the received encrypted one-time password. As an alternative, the receiver may decrypt the received one-time password and then compare the decrypted one-time password with the generated one-time password.

In one or more embodiments of the invention, one-time passwords (e.g., 310X, 310Y) are sent between members after generating the message digest that includes the one-time passwords (e.g., 310X, 310Y) and prior to sending any encrypted confidential information. Thus, members are authenticated prior to the sending and/or receiving of confidential information. In one or more embodiments of the invention, one-time passwords are only valid during a single communication session. For each new communication session, new one-time passwords are generated and subsequently used to authenticate the members. As an alternative, one-time passwords may only be used during a first communication session. Later communication sessions between members may not use one-time passwords. Additional one-time passwords may be generated to account for additional members of the group without departing from the scope of the invention. The additional one-time passwords may be generated, for example, by generating additional message digests.

Continuing with the example message digest (308) in FIG. 7, the algorithm selector bits (e.g., 312X, 312Y) may be similar to the algorithm selector bits (e.g., 302X, 302Y) discussed above with reference to FIG. 6. As shown in FIG. 7, the algorithm selector bits (e.g., 312X, 312Y) may be located in a different position.

The key length (e.g., 314X, 314Y) specifies the size of the encryption key (e.g., 316X, 316Y). Specifically, the key length (e.g., 314X, 314Y) specifies the number of bits in the encryption key (e.g., 316X, 316Y). In one or more embodiments of the invention, the encryption key (e.g., 316X, 316Y) has at least a minimum size (e.g., 64 bit minimum, 128 bit minimum, etc.). Other embodiments of the invention, may use a fixed encryption key length. In such embodiments, the communication may be encrypted using only the components corresponding to the algorithm selector bits and the encryption key of the fixed length.

In one or more embodiments of the invention, a change value (318) provides a pseudo-random value to spawn a new message digest (308). For example, the change value may be used to create a new encryption key or create a new dynamic secret. Use of the change value is discussed above and in FIG. 5A-5B. Further, the stored secrets may be inputted to the n-bit generator to spawn temporary use secrets. All of the spawned secrets are used only during a session in accordance with one or more embodiments of the invention. After the session, the spawned secrets are destroyed so as to be no longer accessible or otherwise discoverable through any nefarious methods. Similar to the temporary use secrets, a change value is destroyed once combined with the appropriate dynamic secret.

Returning to the example message digest (308), FIG. 7 is only one example of the components of a message digest. Some of the components may be removed while other components may be added. For example, the message digest may include discard bits. Discard bits are bits that are ignored. As another example, rather than having the entire encryption key, the message digest may include only the most significant bits or the least significant bits of the encryption key. Another message digest may be generated and include the remaining bits.

FIGS. 8A and 8B show another example of message digests (e.g., 330, 332) in accordance with one or more embodiments of the invention. As shown in the example in FIGS. 8A and 8B, the encryption solutions may span multiple message digests. For example, a first message digest (330) may include only algorithm selector bits (334X), the most significant bits for each of the encryption keys (e.g., 336X, 336Y), and a change value (338). In the example, a second message digest (332) may include only algorithm selector bits (334Y), the least significant bits for each of the encryption keys (e.g., 340X, 340Y), and a change value (342). In the example, encryption solution X may be formed by using algorithm selector X bits (334X) and the concatenation of encryption key X most significant bits (336X) with encryption key X least significant bits (340X). Similarly, encryption solution Y may be formed by using algorithm selector Y bits (334Y) and the concatenation of encryption key Y most significant bits (336Y) with encryption key Y least significant bits (340Y).

The following is an example communication session in accordance with one or more embodiments of the invention. The following example is for illustration purposes only and not intended to limit the scope of the invention. In the following example, consider the scenario in which a group has three members: Bob's computing device (computing device B), Joe's computing device (computing device J), and Sarah's computing device (computing device S).

With the first communication, the security application on computing device B, the security application on computing device J, and the security application on computing device S each create a challenge. For example, computing device B's challenge is "454Bear", computing device J's challenge is "myTower", and computing device S's challenge is "d68saf." Further, each member accesses a certificate authority to obtain the public key of each other member. Computing device B's security application encrypts "454Bear" using computing device J's public key and sends the resulting encrypted challenge to computing device J's security application. Similarly, computing device B's security application encrypts "454Bear" using computing device S's public key and sends the resulting encrypted challenge to computing device S's security application. Computing device J's security application and computing device S's security application similarly encrypt their challenges using the other members' public keys and send their challenges.

After receiving the challenges, computing device B's security application, computing device J's security application, and computing device S's security application decrypt each of the challenges using their corresponding private keys. Computing device B's security application, computing device J's security application, and computing device S's security application each input "454Bear," "myTower," and "d68saf" into their respective n-bit generators to obtain a message digest. Because the n-bit generator provides a deterministic, pseudo-random result, the resulting message digest is the same for computing device B, computing device J, and computing device S. Accordingly, computing device B's security application, computing device J's security application, and computing device S's security application may use the message digest to populate a secrets repository, create encryption solutions, and encrypt and decrypt the communications sent between them using the encryption solutions. The following are sub-examples for computing device B, computing device J, and computing device S to send and receive communications using the generated encryption solutions.

In a second example (based on the same underlying entities as the first example), consider the scenario in which the message digest generated by computing device B, computing device J, and computing device S includes an encryption solution for computing device B to send communications ("encryption solution B"), an encryption solution for computing device J to send communications ("encryption solution J"), and an encryption solution for computing device S to send communications ("encryption solution S"). In the example, computing device B's security application may send a communication to computing device S's security application and computing device J's security application by obtaining an encryption key and an identified encryption algorithm from encryption solution B, encrypting the communication with the encryption key using the identified encryption algorithm, and sending the encrypted file. Computing device S's security application and computing device J's security application, which also have the same message digests, use encryption solution B to obtain the encryption key and identify the encryption algorithm to decrypt the communication. Similarly, when computing device J and computing device S send communications, computing device J uses encryption solution J and computing device S uses encryption solution S. A nefarious computer system, which is not capable of generating the message digest, is unable to even create the encryption key. Moreover, because computing device B's security application, computing device S's security application, and computing device J's security application may continually change the encryption solutions by generating new pseudo-random message digests, the nefarious computer system may be unlikely to identify the correct encryption key and the correct encryption algorithm for the correct message.

In a third example (based on the same underlying entities as the first example), consider the scenario in which the message digest generated by computing device B, computing device J, and computing device S includes an encryption solution for computing device B to receive communications ("encryption solution B"), an encryption solution for computing device J to receive communications ("encryption solution J"), and an encryption solution for computing device S to receive communications ("encryption solution S").

In the third example, computing device B's security application may send a communication to computing device S's security application and computing device J's security application. Computing device B obtains an encryption key and an identified encryption algorithm from encryption solution S, encrypts the communication with the encryption key using the identified encryption algorithm, and sends the encrypted communication to computing device S. Computing device S's security application, which also has the same message digests, uses encryption solution S to obtain the encryption key and identify the encryption algorithm to decrypt the communication.

Similarly, computing device B obtains an encryption key and an identified encryption algorithm from encryption solution J, encrypts the communication with the encryption key using the identified encryption algorithm, and sends the encrypted communication to computing device J. Computing device J's security application, which also has the same message digests, uses encryption solution J to obtain the encryption key and identify the encryption algorithm to decrypt the communication. Similarly, when computing device J and computing device S send communications to computing device B, computing device J and computing device S use encryption solution B. A nefarious computer system, which is not capable of generating the message digest is unable to even create the encryption key. Moreover, because computing device B's security application, computing device S's security application, and computing device J's security application may continually change the encryption solutions by generating new pseudo-random message digests, the nefarious computer system may be unlikely to identify the correct encryption key and the correct encryption algorithm for the correct message.

The above are only a few examples of how the message digest may be used to create multiple encryption solutions to encrypt and decrypt communications. Other possible methods may be used without departing from the scope of the invention. For example, computing device J and computing device S may use the same encryption solution JS for receiving communications, which is different than the encryption solution used by computing device B to receive communications. As another example example, computing device J and computing device S may use the same encryption solution JS for sending communications, which is different than the encryption solution used by computing device B to send communications.

Figure 9:
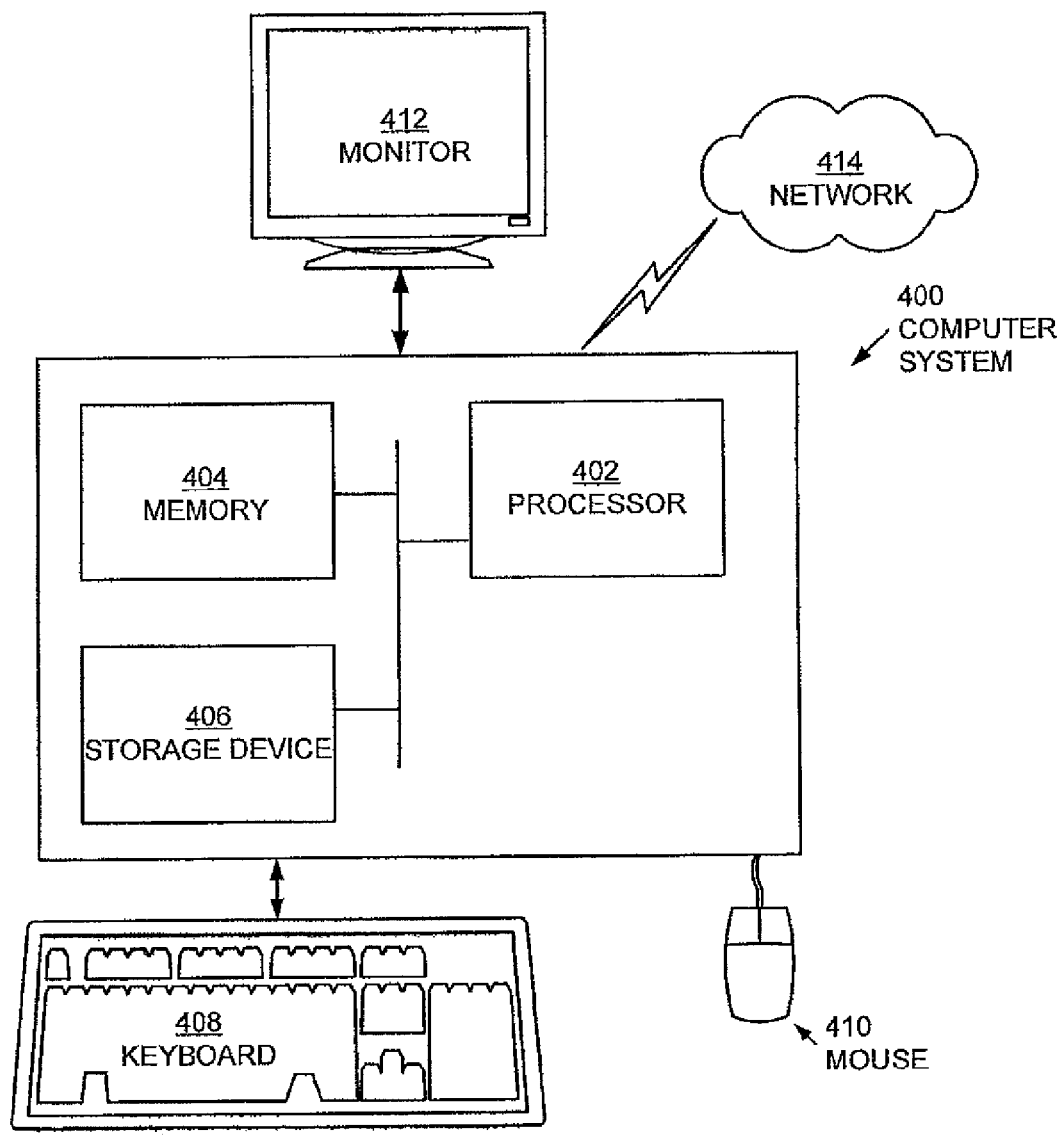
FIG. 9 shows a computer system in accordance with one or more embodiments of the invention.

Embodiments of the invention may be implemented on virtually any type of computer system regardless of the platform being used. The computing device may be the computer system, execute on the computer system, be an external device of the computer system, etc. For example, as shown in FIG. 9, a computer system (400) includes one or more computing processor(s) (402), associated memory (404) (e.g., random access memory (RAM), cache memory, flash memory, etc.), an internal and/or an external storage device (406) (e.g., a hard disk, an optical drive such as a compact disk drive or digital video disk (DVD) drive, a flash memory stick, universal serial bus (USB) drive, smart card, smart phone, etc.), and numerous other elements and functionalities typical of today's computers (not shown). The computer system (400) may also include input means, such as a keyboard (408), a touch screen, a mouse (410), or a microphone (not shown). Further, the computer system (400) may include output means, such as a monitor (412) (e.g., a liquid crystal display (LCD), a plasma display, or cathode ray tube (CRT) monitor). The computer system (400) may be connected to a network (414) (e.g., a local area network (LAN), a wide area network (WAN) such as the Internet, or any other type of network) via a network interface connection (not shown). Those skilled in the art will appreciate that many different types of computer systems exist, and the aforementioned input and output means may take other forms. Generally speaking, the computer system (400) includes at least the minimal processing, input, and/or output means necessary to practice embodiments of the invention.

Computer readable program code to perform embodiments of the invention may be stored on a computer readable medium such as a compact disc (CD), a diskette, a tape, physical memory, or any other physical computer readable storage medium that includes functionality to store computer readable program code to perform embodiments of the invention. In one embodiment of the invention the computer readable program code, when executed by a processor(s), is configured to perform embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for generating at least one secret for use by a plurality of members, comprising:
sending, by a first member, a first request for connection with a second member;
sending, by the first member, a second request for connection with a third member;
receiving, by the first member from the second member, a second input after the first request is sent and after communication is initiated between the first member and the second member;
receiving, by the first member from the third member, a third input after the second request is sent and after communication is initiated between the first member and the third member;
generating, using an n-bit generator executing on the first member, a message digest using a first input, the second input, and the third input, wherein the first input is not obtained from the second member and the first input is not obtained from the third member;
extracting a secret from the message digest;
storing the secret in a secrets repository on the first member; and
generating, by the first member using the n-bit generator and the secret, a second message digest; and
encrypting communication between at least the first member and the second member using at least a portion of the second message digest, including extracting, by the first member, an encryption solution from the second message digest, wherein the encryption solution comprises an encryption key and algorithm selector bits.

2. The method of claim 1, wherein the communication between at least the first member and the second member comprises at least one selected from a group consisting of electronic mail (e-mail), a chat session, a file, and a short message service (SMS) message.

3. The method of claim 1, wherein the encryption solution is used to encrypt communication between the first member and the third member.

4. The method of claim 1, wherein the encryption solution is used to encrypt communication between members of a group, wherein the group comprises the first member, the second member, and the third member.

5. The method of claim 1, further comprising:
encrypting communication between at least the first member and the third member using at least a portion of the second message digest.

6. The method of claim 1, wherein the first request is part of a communication between the first member and the second member, and wherein the communication comprises at least one selected from a group consisting of a short messaging service (SMS) message, an electronic mail (e-mail), a chat message, an audio message, a graphic, and an audio-visual message.

7. The method of claim 1, wherein the first request is a request to join a group and wherein the second request is a request to join the group.

8. The method of claim 1, further comprising:
sending, by the first member to the second member, the first input after communication is initiated between the first member and the second member; and
sending, by the first member to the third member, the first input after communication is initiated between the first member and the third member.

9. The method of claim 1, wherein the first input comprises at least one selected from a group consisting of randomly generated challenge and a passphrase.

10. The method of claim 1, further comprising:
encrypting communication between at least the first member and the second member using at least a portion of the message digest.

11. The method of claim 10, wherein the communication between at least the first member and the second member comprises at least one selected from a group consisting of electronic mail (e-mail), a chat session, a file, and a short message service (SMS) message.

12. The method of claim 10, wherein encrypting communication between at least the first member and the second member using at least the portion of the message digest comprises:
extracting, by the first member, an encryption solution from the message digest, wherein the encryption solution comprises an encryption key and algorithm selector bits.

13. The method of claim 1, wherein the first input is generated by the first member.

14. The method of claim 1, wherein receiving, by the first member from the second member, the second input comprises:
receiving an encrypted value from the second member; and
decrypting, by the first member, the encrypted value to obtain the second input.

15. A method for generating at least one secret for use by a plurality of members, comprising:
receiving, by a first member, a request to contact a second member;
initiating, in response to the request, communication between the first member and the second member;
receiving, by the first member from the second member, a second input after communication is initiated between the first member and the second member;
generating, using an n-bit generator executing on the first member, a message digest using at least a first input and the second input, wherein the first input is not obtained from the second member;
extracting a secret from the message digest;
storing the secret in a secrets repository on the first member; and
generating, by the first member using the n-bit generator and the secret, a second message digest; and
encrypting communication between at least the first member and the second member using at least a portion of the second message digest, including extracting, by the first member, an encryption solution from the second message digest, wherein the encryption solution comprises an encryption key and algorithm selector bits.

16. The method of claim 15, further comprising:
receiving, by the first member, a request to contact a third member;
initiating, in response to the request to contact the third member, communication between the first member and the third member; and
receiving, by the first member from the third member, a third input after communication is initiated between the first member and the third member,
wherein generating the message digest further comprises using the third input.

17. The method of claim 15, wherein the request comprises at least one selected from a group consisting of contact information for the second member, secure communication channel information for communicating with the second member, and a name of a user of the second member.

18. The method of claim 17, wherein the first and second members communicate using the secure communication channel information.

19. The method of claim 15, wherein the communication between at least the first member and the second member comprises at least one selected from a group consisting of electronic mail (e-mail), a chat session, a file, and a short message service (SMS) message.

20. A non-transitory computer readable medium comprising instructions, which when executed by a processor perform a method, the method comprising:
sending, by a first member, a first request for connection with a second member;
sending, by the first member, a second request to connection with a third member;
receiving, by the first member from the second member, a second input after the first request is sent and after communication is initiated between the first member and the second member;
receiving, by the first member from the third member, a third input after the second request is sent and after communication is initiated between the first member and the third member;
generating, using an n-bit generator executing on the first member, a message digest using a first input, the second input, and the third input, wherein the first input is not obtained from the second member and the first input is not obtained from the third member;
extracting a secret from the message digest;
storing the secret in a secrets repository on the first member;
generating, by the first member using the n-bit generator and the secret, a second message digest;

encrypting communication between at least the first member and the second member using at least a portion of the second message digest; and encrypting communication between at least the first member and the third member using at least a portion of the second message digest, including extracting, by the first member, an encryption solution from the second message digest, wherein the encryption solution comprises an encryption key and algorithm selector bits.

21. A non-transitory computer readable medium comprising instructions, which when executed by a processor perform a method, the method comprising:

receiving, by a first member, a request to contact a second member;

initiating, in response to the request, communication between the first member and the second member;

receiving, by the first member from the second member, a second input after communication is initiated between the first member and the second member;

generating, using an n-bit generator executing on the first member, a message digest using at least a first input and the second input, wherein the first input is not obtained from the second member;

extracting a secret from the message digest;

storing the secret in a secrets repository on the first member;

generating, by the first member using the n-bit generator and the secret, a second message digest;

encrypting communication between at least the first member and the second member using at least a portion of the second message digest; and encrypting communication between at least the first member and the third member using at least a portion of the second message digest, including extracting, by the first member, an encryption solution from the second message digest, wherein the encryption solution comprises an encryption key and algorithm selector bits.

* * * * *